United States Patent
Jang et al.

(10) Patent No.: US 12,467,025 B2
(45) Date of Patent: Nov. 11, 2025

(54) CELL CULTURE SHEET AND LARGE-CAPACITY CELL CULTURE DEVICE INCLUDING SAME

(71) Applicant: AMOLIFESCIENCE CO., LTD., Seoul (KR)

(72) Inventors: Seon Ho Jang, Seoul (KR); In Yong Seo, Seoul (KR); Kyoung Ku Han, Seoul (KR); Dong Sik Seo, Seoul (KR); Hee Sung Park, Seoul (KR); Su Yeon Lee, Seoul (KR); Hyo Jung Lee, Seoul (KR); Ji Young Kim, Seoul (KR); Chan Kim, Seoul (KR); Seoung Hoon Lee, Seoul (KR)

(73) Assignee: AMOLIFESCIENCE CO., LTD., Seoul (KR)

( * ) Notice: Subject to any disclaimer, the term of this patent is extended or adjusted under 35 U.S.C. 154(b) by 787 days.

(21) Appl. No.: 17/640,970

(22) PCT Filed: Sep. 7, 2020

(86) PCT No.: PCT/KR2020/012067
§ 371 (c)(1),
(2) Date: Mar. 7, 2022

(87) PCT Pub. No.: WO2021/045602
PCT Pub. Date: Mar. 11, 2021

(65) Prior Publication Data
US 2022/0340852 A1    Oct. 27, 2022

(30) Foreign Application Priority Data

Sep. 6, 2019 (KR) .................. 10-2019-0110831

(51) Int. Cl.
*C12M 1/12* (2006.01)
*C12M 3/00* (2006.01)
*C12N 5/0775* (2010.01)

(52) U.S. Cl.
CPC ............ *C12M 25/04* (2013.01); *C12M 23/44* (2013.01); *C12N 5/0662* (2013.01);
(Continued)

(58) Field of Classification Search
None
See application file for complete search history.

(56) References Cited

U.S. PATENT DOCUMENTS

| 9,057,715 B2 | 6/2015 | Kim |
| 2006/0199040 A1* | 9/2006 | Yamada ................. G02B 1/118 428/701 |

(Continued)

FOREIGN PATENT DOCUMENTS

| JP | 2005-226210 A | 8/2005 |
| JP | 2019062840 A | 4/2019 |

(Continued)

OTHER PUBLICATIONS

Document Entitled WO2017209521A1 Scaffold for Cell Culture or Tissue Engineering, machine translation of WO 2017/209521 A1 provided by Espacenet, original document published 2017. (Year: 2017).*

(Continued)

*Primary Examiner* — Michael A Marcheschi
*Assistant Examiner* — Ashley Lopezlira
(74) *Attorney, Agent, or Firm* — ROTHWELL, FIGG, ERNST & MANBECK, P.C.

(57) ABSTRACT

Provided is a cell culture sheet. A cell culture sheet according to an embodiment of the present invention includes: a fiber web which has a 3-dimensional network structure
(Continued)

formed through the accumulation of support fibers having an average diameter of at most 1.5 μm, and has a basis weight of 1 to 15 g/m$^2$; and a functional coating layer which is coated on the support fibers exposed on at least one surface of the fiber web, and has a function of promoting one or more of the adhesion, movement, proliferation, and differentiation of cells. Accordingly, cell adhesion is improved due to the large specific surface area and the surface morphology suitable for cells, and the adhered cells are stably supported. Moreover, the cells can be cultured at high density at a high culture efficiency, and can be cultured and recovered without agglomeration caused by forming a thin film.

16 Claims, 10 Drawing Sheets

Specification includes a Sequence Listing.

(52) U.S. Cl.
CPC ...... *C12N 2513/00* (2013.01); *C12N 2533/30* (2013.01); *C12N 2533/50* (2013.01)

(56) References Cited

U.S. PATENT DOCUMENTS

| | | | |
|---|---|---|---|
| 2008/0009027 A1* | 1/2008 | Fraker | C12M 23/12 435/243 |
| 2019/0270956 A1* | 9/2019 | Hagihara | C12M 29/00 |
| 2019/0338233 A1 | 11/2019 | Seo et al. | |
| 2020/0318049 A1 | 10/2020 | Koo et al. | |

FOREIGN PATENT DOCUMENTS

| | | | | |
|---|---|---|---|---|
| KR | 10-2008-0104932 A | 12/2008 | | |
| KR | 2009-0056667 A | 6/2009 | | |
| KR | 10-2012-0097948 A | 9/2012 | | |
| KR | 20170008024 A1 | 1/2017 | | |
| KR | 10-2017-0135769 A | 12/2017 | | |
| KR | 10-2017-0140785 A | 12/2017 | | |
| KR | 10-2019-0006467 A | 1/2019 | | |
| WO | 97/12960 A2 | 4/1997 | | |
| WO | WO-2017204563 A1 * | 11/2017 | ............. | A61L 27/16 |
| WO | WO-2017209521 A1 * | 12/2017 | ............. | A61L 27/14 |
| WO | WO-2018182044 A1 * | 10/2018 | ............. | C12M 23/12 |

OTHER PUBLICATIONS

Document entitled WO2017204563A1 Yarn for Cell Culture Support, and Fabric for Cell Culture Support Including Same, machine translation of WO 2017204563 A1 provided by Espacenet, original document published 2017. (Year: 2017).*

Document entitled WO2018182044A1 Cell Culture Substrate, Cancer Cell Aggregate, and Method for Producing the Same Using the Substrate, and Drug Screening Method Using the Cancer Cell Aggregate, machine translation of WO 2018/182044 A1 provided by Espacenet, original document published 2018. (Year: 2018).*

English translation of Office Action in corresponding Chinese Patent Application No. 2020800765505 dated Jun. 10, 2025 (2 pages).

* cited by examiner

SEQUENCE LISTING

<160> NUMBER OF SEQ ID NOS: 30

<210> SEQ ID NO 1
<211> LENGTH: 196

<212> TYPE: PRT
<213> ORGANISM: Artificial Sequence
<220> FEATURE:
<223> OTHER INFORMATION: adhesive component

<400> SEQUENCE: 1

Met Ala Lys Pro Ser Tyr Pro Pro Thr Tyr Lys Ala Lys Pro Ser Tyr
1               5                   10                  15

Pro Pro Thr Tyr Lys Ala Lys Pro Ser Tyr Pro Pro Thr Tyr Lys Ala
                20                  25                  30

Lys Pro Ser Tyr Pro Pro Thr Tyr Lys Ala Lys Pro Ser Tyr Pro Pro
            35                  40                  45

Thr Tyr Lys Ala Lys Pro Ser Tyr Pro Pro Thr Tyr Lys Ser Ser Glu
        50                  55                  60

Glu Tyr Lys Gly Gly Tyr Tyr Pro Gly Asn Thr Tyr His Tyr His Ser
65                  70                  75                  80

Gly Gly Ser Tyr His Gly Ser Gly Tyr His Gly Gly Tyr Lys Gly Lys
                85                  90                  95

Tyr Tyr Gly Lys Ala Lys Lys Tyr Tyr Lys Tyr Lys Asn Ser Gly
                100                 105                 110

Lys Tyr Lys Tyr Leu Lys Lys Ala Arg Lys Tyr His Arg Lys Gly Tyr
                115                 120                 125

Lys Lys Tyr Tyr Gly Gly Ser Ser Ala Lys Pro Ser Tyr Pro Pro Thr
            130                 135                 140

Tyr Lys Ala Lys Pro Ser Tyr Pro Pro Thr Tyr Lys Ala Lys Pro Ser
145                 150                 155                 160

Tyr Pro Pro Thr Tyr Lys Ala Lys Pro Ser Tyr Pro Pro Thr Tyr Lys
                165                 170                 175

Ala Lys Pro Ser Tyr Pro Pro Thr Tyr Lys Ala Lys Pro Ser Tyr Pro
            180                 185                 190

Pro Thr Tyr Lys
            195

<210> SEQ ID NO 2
<211> LENGTH: 202
<212> TYPE: PRT
<213> ORGANISM: Artificial Sequence
<220> FEATURE:
<223> OTHER INFORMATION: adhesive component

<400> SEQUENCE: 2

Met Ala Lys Pro Ser Tyr Pro Pro Thr Tyr Lys Ala Lys Pro Ser Tyr
1               5                   10                  15

Pro Pro Thr Tyr Lys Ala Lys Pro Ser Tyr Pro Pro Thr Tyr Lys Ala
                20                  25                  30

Lys Pro Ser Tyr Pro Pro Thr Tyr Lys Ala Lys Pro Ser Tyr Pro Pro
            35                  40                  45

Thr Tyr Lys Ala Lys Pro Ser Tyr Pro Pro Thr Tyr Lys Ser Ser Glu
        50                  55                  60

Glu Tyr Lys Gly Gly Tyr Tyr Pro Gly Asn Thr Tyr His Tyr His Ser
65                  70                  75                  80

Gly Gly Ser Tyr His Gly Ser Gly Tyr His Gly Gly Tyr Lys Gly Lys
                85                  90                  95

Tyr Tyr Gly Lys Ala Lys Lys Tyr Tyr Lys Tyr Lys Asn Ser Gly
                100                 105                 110

Lys Tyr Lys Tyr Leu Lys Lys Ala Arg Lys Tyr His Arg Lys Gly Tyr
                115                 120                 125

```
Lys Lys Tyr Tyr Gly Gly Ser Ser Ala Lys Pro Ser Tyr Pro Pro Thr
            130             135             140
Tyr Lys Ala Lys Pro Ser Tyr Pro Pro Thr Tyr Lys Ala Lys Pro Ser
145             150             155             160
Tyr Pro Pro Thr Tyr Lys Ala Lys Pro Ser Tyr Pro Pro Thr Tyr Lys
                165             170             175
Ala Lys Pro Ser Tyr Pro Pro Thr Tyr Lys Ala Lys Pro Ser Tyr Pro
            180             185             190
Pro Thr Tyr Lys Gly Arg Gly Asp Ser Pro
            195             200
```

```
<210> SEQ ID NO 3
<211> LENGTH: 172
<212> TYPE: PRT
<213> ORGANISM: Artificial Sequence
<220> FEATURE:
<223> OTHER INFORMATION: adhesive component

<400> SEQUENCE: 3

Met Ala Lys Pro Ser Tyr Pro Pro Thr Tyr Lys Ala Lys Pro Ser Tyr
1               5                  10                  15
Pro Pro Thr Tyr Lys Ala Lys Pro Ser Tyr Pro Pro Thr Tyr Lys Ala
            20                  25                  30
Lys Pro Ser Tyr Pro Pro Thr Tyr Lys Ala Lys Pro Ser Tyr Pro Pro
        35                  40                  45
Thr Tyr Lys Ala Lys Pro Ser Tyr Pro Pro Thr Tyr Lys Pro Trp Ala
    50                  55                  60
Asp Tyr Tyr Gly Pro Lys Tyr Gly Pro Pro Arg Arg Tyr Gly Gly Gly
65                  70                  75                  80
Asn Tyr Asn Arg Tyr Gly Arg Arg Tyr Gly Tyr Lys Gly Trp Asn
                85                  90                  95
Asn Gly Trp Lys Arg Gly Arg Trp Gly Arg Lys Tyr Tyr Gly Ser Ala
            100             105             110
Lys Pro Ser Tyr Pro Pro Thr Tyr Lys Ala Lys Pro Ser Tyr Pro Pro
        115             120             125
Thr Tyr Lys Ala Lys Pro Ser Tyr Pro Pro Thr Tyr Lys Ala Lys Pro
    130             135             140
Ser Tyr Pro Pro Thr Tyr Lys Ala Lys Pro Ser Tyr Pro Pro Thr Tyr
145             150             155             160
Lys Ala Lys Pro Ser Tyr Pro Pro Thr Tyr Lys Leu
                165             170
```

```
<210> SEQ ID NO 4
<211> LENGTH: 46
<212> TYPE: PRT
<213> ORGANISM: Artificial Sequence
<220> FEATURE:
<223> OTHER INFORMATION: adhesive component

<400> SEQUENCE: 4

Ala Asp Tyr Tyr Gly Pro Lys Tyr Gly Pro Pro Arg Arg Tyr Gly Gly
1               5                  10                  15
Gly Asn Tyr Asn Arg Tyr Gly Arg Arg Tyr Gly Gly Tyr Lys Gly Trp
            20                  25                  30
Asn Asn Gly Trp Lys Arg Gly Arg Trp Gly Arg Lys Tyr Tyr
        35                  40                  45
```

```
<210> SEQ ID NO 5
<211> LENGTH: 76
<212> TYPE: PRT
<213> ORGANISM: Artificial Sequence
<220> FEATURE:
<223> OTHER INFORMATION: adhesive component

<400> SEQUENCE: 5

Ser Ser Glu Glu Tyr Lys Gly Gly Tyr Tyr Pro Gly Asn Thr Tyr His
1               5                   10                  15

Tyr His Ser Gly Gly Ser Tyr His Gly Ser Gly Tyr His Gly Gly Tyr
            20                  25                  30

Lys Gly Lys Tyr Tyr Gly Lys Ala Lys Tyr Tyr Lys Tyr Lys
        35                  40                  45

Asn Ser Gly Lys Tyr Lys Tyr Leu Lys Lys Ala Arg Lys Tyr His Arg
    50                  55                  60

Lys Gly Tyr Lys Lys Tyr Tyr Gly Gly Gly Ser Ser
65                  70                  75

<210> SEQ ID NO 6
<211> LENGTH: 10
<212> TYPE: PRT
<213> ORGANISM: Artificial Sequence
<220> FEATURE:
<223> OTHER INFORMATION: adhesive component

<400> SEQUENCE: 6

Ala Lys Pro Ser Tyr Pro Pro Thr Tyr Lys
1               5                   10

<210> SEQ ID NO 7
<211> LENGTH: 60
<212> TYPE: PRT
<213> ORGANISM: Artificial Sequence
<220> FEATURE:
<223> OTHER INFORMATION: adhesive component

<400> SEQUENCE: 7

Ala Lys Pro Ser Tyr Pro Pro Thr Tyr Lys Ala Lys Pro Ser Tyr Pro
1               5                   10                  15

Pro Thr Tyr Lys Ala Lys Pro Ser Tyr Pro Pro Thr Tyr Lys Ala Lys
            20                  25                  30

Pro Ser Tyr Pro Pro Thr Tyr Lys Ala Lys Pro Ser Tyr Pro Pro Thr
        35                  40                  45

Tyr Lys Ala Lys Pro Ser Tyr Pro Pro Thr Tyr Lys
    50                  55                  60

<210> SEQ ID NO 8
<211> LENGTH: 582
<212> TYPE: PRT
<213> ORGANISM: Artificial Sequence
<220> FEATURE:
<223> OTHER INFORMATION: adhesive component

<400> SEQUENCE: 8

Ala Leu Ala Leu Tyr Ser Pro Arg Ala Ser Glu Arg Thr Tyr Arg Pro
1               5                   10                  15

Arg Ala Pro Arg Ala Thr His Arg Thr Tyr Arg Leu Tyr Ser Ala Leu
            20                  25                  30

Ala Leu Tyr Ser Pro Arg Ala Ser Glu Arg Thr Tyr Arg Pro Arg Ala
        35                  40                  45

Pro Arg Ala Thr His Arg Thr Tyr Arg Leu Tyr Ser Ala Leu Ala Leu
```

```
                50                  55                  60
Tyr Ser Pro Arg Ala Ser Glu Arg Thr Tyr Arg Pro Arg Ala Pro Arg
65                  70                  75                  80

Ala Thr His Arg Thr Tyr Arg Leu Tyr Ser Ala Leu Ala Leu Tyr Ser
                85                  90                  95

Pro Arg Ala Ser Glu Arg Thr Tyr Arg Pro Arg Ala Pro Arg Ala Thr
            100                 105                 110

His Arg Thr Tyr Arg Leu Tyr Ser Ala Leu Ala Leu Tyr Ser Pro Arg
            115                 120                 125

Ala Ser Glu Arg Thr Tyr Arg Pro Arg Ala Pro Arg Ala Thr His Arg
            130                 135                 140

Thr Tyr Arg Leu Tyr Ser Ala Leu Ala Leu Tyr Ser Pro Arg Ala Ser
145                 150                 155                 160

Glu Arg Thr Tyr Arg Pro Arg Ala Pro Arg Ala Thr His Arg Thr Tyr
            165                 170                 175

Arg Leu Tyr Ser Ser Glu Arg Ser Glu Arg Gly Leu Ala Gly Leu Ala
            180                 185                 190

Thr Tyr Arg Leu Tyr Ser Gly Leu Tyr Gly Leu Tyr Thr Tyr Arg Thr
            195                 200                 205

Tyr Arg Pro Arg Ala Gly Leu Tyr Ala Ser Asn Ala Leu Ala Thr Tyr
210                 215                 220

Arg His Ile Ser Thr Tyr Arg His Ile Ser Ser Glu Arg Gly Leu Tyr
225                 230                 235                 240

Gly Leu Tyr Ser Glu Arg Thr Tyr Arg His Ile Ser Gly Leu Tyr Ser
                245                 250                 255

Glu Arg Gly Leu Tyr Thr Tyr Arg His Ile Ser Gly Leu Tyr Gly Leu
            260                 265                 270

Tyr Thr Tyr Arg Leu Tyr Ser Gly Leu Tyr Leu Tyr Ser Thr Tyr Arg
            275                 280                 285

Thr Tyr Arg Gly Leu Tyr Leu Tyr Ser Ala Leu Ala Leu Tyr Ser Leu
            290                 295                 300

Tyr Ser Thr Tyr Arg Thr Tyr Arg Thr Tyr Arg Leu Tyr Ser Thr Tyr
305                 310                 315                 320

Arg Leu Tyr Ser Ala Ser Asn Ser Glu Arg Gly Leu Tyr Leu Tyr Ser
                325                 330                 335

Thr Tyr Arg Leu Tyr Ser Thr Tyr Arg Leu Glu Ala Leu Tyr Ser Leu
            340                 345                 350

Tyr Ser Ala Leu Ala Ala Arg Gly Leu Tyr Ser Thr Tyr Arg His Ile
            355                 360                 365

Ser Ala Arg Gly Leu Tyr Ser Gly Leu Tyr Thr Tyr Arg Leu Tyr Ser
            370                 375                 380

Thr Tyr Arg Thr Tyr Arg Gly Leu Tyr Gly Leu Tyr Ser Glu Arg Ser
385                 390                 395                 400

Glu Arg Ala Leu Ala Leu Tyr Ser Pro Arg Ala Ser Glu Arg Thr Tyr
            405                 410                 415

Arg Pro Arg Ala Pro Arg Ala Thr His Arg Thr Tyr Arg Leu Tyr Ser
            420                 425                 430

Ala Leu Ala Leu Tyr Ser Pro Arg Ala Ser Glu Arg Thr Tyr Arg Pro
            435                 440                 445

Arg Ala Pro Arg Ala Thr His Arg Thr Tyr Arg Leu Tyr Ser Ala Leu
            450                 455                 460

Ala Leu Tyr Ser Pro Arg Ala Ser Glu Arg Thr Tyr Arg Pro Arg Ala
465                 470                 475                 480
```

-continued

```
Pro Arg Ala Thr His Arg Thr Tyr Arg Leu Tyr Ser Ala Leu Ala Leu
                485                 490                 495

Tyr Ser Pro Arg Ala Ser Glu Arg Thr Tyr Arg Pro Arg Ala Pro Arg
            500                 505                 510

Ala Thr His Arg Thr Tyr Arg Leu Tyr Ser Ala Leu Ala Leu Tyr Ser
        515                 520                 525

Pro Arg Ala Ser Glu Arg Thr Tyr Arg Pro Arg Ala Pro Arg Ala Thr
    530                 535                 540

His Arg Thr Tyr Arg Leu Tyr Ser Ala Leu Ala Leu Tyr Ser Pro Arg
545                 550                 555                 560

Ala Ser Glu Arg Thr Tyr Arg Pro Arg Ala Pro Arg Ala Thr His Arg
                565                 570                 575

Thr Tyr Arg Leu Tyr Ser
            580

<210> SEQ ID NO 9
<211> LENGTH: 3
<212> TYPE: PRT
<213> ORGANISM: Artificial Sequence
<220> FEATURE:
<223> OTHER INFORMATION: physiologically active component

<400> SEQUENCE: 9

Arg Gly Asp
1

<210> SEQ ID NO 10
<211> LENGTH: 4
<212> TYPE: PRT
<213> ORGANISM: Artificial Sequence
<220> FEATURE:
<223> OTHER INFORMATION: physiologically active component

<400> SEQUENCE: 10

Arg Gly Asp Ser
1

<210> SEQ ID NO 11
<211> LENGTH: 4
<212> TYPE: PRT
<213> ORGANISM: Artificial Sequence
<220> FEATURE:
<223> OTHER INFORMATION: physiologically active component

<400> SEQUENCE: 11

Arg Gly Asp Cys
1

<210> SEQ ID NO 12
<211> LENGTH: 4
<212> TYPE: PRT
<213> ORGANISM: Artificial Sequence
<220> FEATURE:
<223> OTHER INFORMATION: physiologically active component

<400> SEQUENCE: 12

Arg Gly Asp Val
1

<210> SEQ ID NO 13
<211> LENGTH: 10
<212> TYPE: PRT
<213> ORGANISM: Artificial Sequence
```

```
<220> FEATURE:
<223> OTHER INFORMATION: physiologically active component

<400> SEQUENCE: 13

Arg Gly Asp Ser Pro Ala Ser Ser Lys Pro
1               5                   10

<210> SEQ ID NO 14
<211> LENGTH: 5
<212> TYPE: PRT
<213> ORGANISM: Artificial Sequence
<220> FEATURE:
<223> OTHER INFORMATION: physiologically active component

<400> SEQUENCE: 14

Gly Arg Gly Asp Ser
1               5

<210> SEQ ID NO 15
<211> LENGTH: 6
<212> TYPE: PRT
<213> ORGANISM: Artificial Sequence
<220> FEATURE:
<223> OTHER INFORMATION: physiologically active component

<400> SEQUENCE: 15

Gly Arg Gly Asp Thr Pro
1               5

<210> SEQ ID NO 16
<211> LENGTH: 6
<212> TYPE: PRT
<213> ORGANISM: Artificial Sequence
<220> FEATURE:
<223> OTHER INFORMATION: physiologically active component

<400> SEQUENCE: 16

Gly Arg Gly Asp Ser Pro
1               5

<210> SEQ ID NO 17
<211> LENGTH: 7
<212> TYPE: PRT
<213> ORGANISM: Artificial Sequence
<220> FEATURE:
<223> OTHER INFORMATION: physiologically active component

<400> SEQUENCE: 17

Gly Arg Gly Asp Ser Pro Cys
1               5

<210> SEQ ID NO 18
<211> LENGTH: 5
<212> TYPE: PRT
<213> ORGANISM: Artificial Sequence
<220> FEATURE:
<223> OTHER INFORMATION: physiologically active component

<400> SEQUENCE: 18

Tyr Arg Gly Asp Ser
1               5

<210> SEQ ID NO 19
<211> LENGTH: 9
<212> TYPE: PRT
<213> ORGANISM: Artificial Sequence
<220> FEATURE:
```

```
<223> OTHER INFORMATION: physiologically active component

<400> SEQUENCE: 19

Ser Pro Pro Arg Arg Ala Arg Val Thr
1               5

<210> SEQ ID NO 20
<211> LENGTH: 8
<212> TYPE: PRT
<213> ORGANISM: Artificial Sequence
<220> FEATURE:
<223> OTHER INFORMATION: physiologically active component

<400> SEQUENCE: 20

Trp Gln Pro Pro Arg Ala Arg Ile
1               5

<210> SEQ ID NO 21
<211> LENGTH: 12
<212> TYPE: PRT
<213> ORGANISM: Artificial Sequence
<220> FEATURE:
<223> OTHER INFORMATION: physiologically active component

<400> SEQUENCE: 21

Asn Arg Trp His Ser Ile Tyr Ile Thr Arg Phe Gly
1               5                   10

<210> SEQ ID NO 22
<211> LENGTH: 12
<212> TYPE: PRT
<213> ORGANISM: Artificial Sequence
<220> FEATURE:
<223> OTHER INFORMATION: physiologically active component

<400> SEQUENCE: 22

Arg Lys Arg Leu Gln Val Gln Leu Ser Ile Arg Thr
1               5                   10

<210> SEQ ID NO 23
<211> LENGTH: 12
<212> TYPE: PRT
<213> ORGANISM: Artificial Sequence
<220> FEATURE:
<223> OTHER INFORMATION: physiologically active component

<400> SEQUENCE: 23

Lys Ala Phe Asp Ile Thr Tyr Val Arg Leu Lys Phe
1               5                   10

<210> SEQ ID NO 24
<211> LENGTH: 5
<212> TYPE: PRT
<213> ORGANISM: Artificial Sequence
<220> FEATURE:
<223> OTHER INFORMATION: physiologically active component

<400> SEQUENCE: 24

Ile Lys Val Ala Asn
1               5

<210> SEQ ID NO 25
<211> LENGTH: 16
<212> TYPE: PRT
<213> ORGANISM: Artificial Sequence
<220> FEATURE:
<223> OTHER INFORMATION: physiologically active component
```

```
<400> SEQUENCE: 25

Lys Lys Gln Arg Phe Arg His Arg Asn Arg Lys Gly Tyr Arg Ser Gln
1               5                   10                  15

<210> SEQ ID NO 26
<211> LENGTH: 9
<212> TYPE: PRT
<213> ORGANISM: Artificial Sequence
<220> FEATURE:
<223> OTHER INFORMATION: physiologically active component

<400> SEQUENCE: 26

Val Ala Glu Ile Asp Gly Ile Gly Leu
1               5

<210> SEQ ID NO 27
<211> LENGTH: 10
<212> TYPE: PRT
<213> ORGANISM: Artificial Sequence
<220> FEATURE:
<223> OTHER INFORMATION: physiologically active component

<400> SEQUENCE: 27

Pro His Ser Arg Asn Arg Gly Asp Ser Pro
1               5                   10

<210> SEQ ID NO 28
<211> LENGTH: 12
<212> TYPE: PRT
<213> ORGANISM: Artificial Sequence
<220> FEATURE:
<223> OTHER INFORMATION: physiologically active component

<400> SEQUENCE: 28

Asn Arg Trp His Ser Ile Tyr Ile Thr Arg Phe Gly
1               5                   10

<210> SEQ ID NO 29
<211> LENGTH: 12
<212> TYPE: PRT
<213> ORGANISM: Artificial Sequence
<220> FEATURE:
<223> OTHER INFORMATION: physiologically active component

<400> SEQUENCE: 29

Thr Trp Tyr Lys Ile Ala Phe Gln Arg Asn Arg Lys
1               5                   10

<210> SEQ ID NO 30
<211> LENGTH: 20
<212> TYPE: PRT
<213> ORGANISM: Artificial Sequence
<220> FEATURE:
<223> OTHER INFORMATION: physiologically active component

<400> SEQUENCE: 30

Pro His Ser Arg Asn Ser Gly Ser Gly Ser Gly Ser Gly Arg
1               5                   10                  15

Gly Asp Ser Pro
            20
```

CELL CULTURE SHEET AND LARGE-CAPACITY CELL CULTURE DEVICE INCLUDING SAME

CROSS-REFERENCE TO RELATED APPLICATIONS

This application is a 35 U.S.C. § 371 National Phase Entry Application from PCT/KR2020/012067 filed on Sep. 7, 2020, and designating the United States, which claims priority to and the benefit of Korean Patent Application No. 10-2019-0110831, filed on Sep. 6, 2019, the entire contents of which are incorporated herein by reference in their entireties.

REFERENCE TO SEQUENCE LISTING

The present application includes a Sequence Listing filed in electronic format. The Sequence Listing is entitled "SOP115840US_seq1_ST25.txt" created on May 5, 2022, and is 20,480 bytes in size. The information in the electronic format of the Sequence Listing is part of the present application and is incorporated herein by reference in its entirety.

TECHNICAL FIELD

The present invention relates to a cell culture sheet, and more specifically to a cell culture sheet suitable for mass production of cells and a large-capacity cell culture device including the same.

BACKGROUND

Recently, as the use of cultured cells is expanded for the treatment of diseases, interest and research on cell culture are increasing. Cell culture is a technique of collecting cells from a living body and culturing outside the body, and cultured cells differentiate into various tissues of the body such as skin, organs, nerves and the like and are transplanted into the human body, or cultured cells can be utilized in the treatment of various diseases by transplanting them into the human body in a state before differentiation to allow engraftment and differentiation to occur at the same time.

In order to transplant cultured cells into the human body for the treatment of diseases, it is required to be cultured such that the number of target cells exceeds the laboratory level. Accordingly, the development of a culture device or system capable of culturing cells in a large capacity beyond the laboratory level is being actively conducted.

However, since cells are difficult to proliferate in three dimensions, there is a difficulty that cells must be obtained through two-dimensional proliferation. In addition, in order to culture a large amount of cells through two-dimensional proliferation, the area of a cell culture sheet must be increased, but there is a limitation to continuously increasing the area of the cell culture sheet, when considering a cell culture device or system having a limited volume.

In addition, the culture method may vary depending on the type of cells to be cultured, and some cells are cultured by circulating a medium such that the concentration of carbon dioxide is properly maintained, and the fluid flow generated in the circulating process of the medium may detach cells that are seeded in the cell culture sheet, and thus, there is a problem in that the cell culture efficiency may be significantly reduced when the adhesion between the cell culture sheet and the cells to be cultured is weak.

Meanwhile, when the adhesion between the cells and the cell culture sheet is improved, the cell culture is well performed, but when the cultured cells are recovered after the culture process, there may be a problem in that the recovery is difficult. In addition, if the cells are not easily detached from the sheet, a higher level of physical external force or chemical treatment is required, and in this process, the cultured cells may be damaged.

Moreover, in cultured cells, the cells must be separated and recovered individually, and depending on the cell culture sheet, the cultured cells are cultured to form a thin film combined with various substances such as collagen and the like, and are recovered as a thin film even at the time of recovery, and it is not easy to separate cells into individual cells through a thin membrane, which is a collected cell mass, and there is a problem in that the cell mass in a thin membrane state is difficult to use for research purposes.

Accordingly, the situation is that there is an urgent need to solve these problems and develop a cell culture sheet suitable for a large-capacity cell culture system or cell culture device.

SUMMARY OF THE INVENTION

The present invention has been devised in consideration of the above points, and it is an object of the present invention to provide a cell culture sheet which is capable of culturing cells to be cultured on the cell culture sheet at a high density and at the same time culturing and recovering cells without agglomeration such as forming a thin film.

In addition, it is another object of the present invention to provide a cell culture sheet which has excellent cell adhesion, and as the adhered cells can be stably supported, an external force such as the circulating flow of the medium exists, and due to this, it is possible to achieve a high cell culture efficiency even in a culture environment in which the cell culture sheet is shaken.

In addition, it is still another object of the present invention has to provide a cell culture sheet which is capable of culturing cells cultured in a large-capacity culture device such that these cells are younger and healthier without changing the character thereof, compared to cells cultured through conventional culture.

Furthermore, it is still another object of the present invention to provide a large-capacity cell culture device which is capable of stably culturing and recovering target cells, particularly stem cells, in large quantities by using the cell culture sheet according to the present invention.

In order to solve the aforementioned problems, the present invention provides a cell culture sheet, including a fiber web which has a 3-dimensional network structure formed through the accumulation of support fibers having an average diameter of at most 1.5 µm, and has a basis weight of 1 to 15 g/m$^2$; and a functional coating layer which is coated on the support fibers exposed on at least one surface of the fiber web, and has a function of promoting one or more of the adhesion, movement, proliferation and differentiation of cells According to an exemplary embodiment of the present invention, the cell culture sheet may have an area of 100 cm$^2$ or more.

In addition, the cell culture sheet may be for culturing stem cells. In this case, the stem cells may be at least one selected from the group consisting of human induced pluripotent stem cells (hiPSC), human cardiac stem cells (hCSC), mesenchymal stem cells (MSC), murine embryonic stem cells (mESCs) and osteoblasts.

In addition, the number of cells recovered after culturing under Culture Condition 1 below may be 9 times or more per unit area (cm$^2$) compared to the number of seeded cells:

[Culture Condition 1]

60 cell culture sheets at 25 cm×25 cm in width and length per sheet are fixed inside a housing by spacing apart such that the top and bottom interval between the cell culture sheets is 1 mm, and after a medium mixed with stem cells is injected into the housing, the housing is sealed from the outside air and cultured at 37° C. for 4 days.

In addition, the number of cells recovered after culturing under Culture Condition 2 below may be 25 times or more per unit area (cm$^2$) compared to the number of seeded cells:

[Culture Condition 2]

100 cell culture sheets at 25 cm×25 cm in width and length per sheet are fixed inside a housing by spacing apart such that the top and bottom interval between the cell culture sheets is 1 mm, and after a medium mixed with stem cells is injected into the housing, the housing is sealed from the outside air and cultured at 37° C. for 5 days, and after 24 hours after seeding the cells, it is cultured by replacing once with the same medium that does not include stem cells.

In addition, the support fibers may include polyvinylidene fluoride (PVDF).

In addition, the center line average roughness (Ra) of one surface of the fiber web on which the functional coating layer is formed may be 0.15 to 1.0 μm, and the developed surface area ratio (Sdr) may be 1.3 to 3.0.

In addition, the cell culture sheet may be for culturing stem cells, the average diameter of the support fibers may be 200 to 600 nm, the center line average roughness (Ra) of one surface of the fiber web on which the functional coating layer is formed may be 0.15 to 0.6 μm, and the developed surface area ratio (Sdr) may be 1.3 to 2.3.

In addition, the cell culture sheet may be for culturing stem cells, and the cell culture sheet may have an average diameter of support fibers of 500 to 600 nm, and the fiber web may have a basis weight of 3 to 12 g/m$^2$ and an air permeability of 4.5 to 8.0 cfm.

In addition, the cell culture sheet may further include a support film fixed to one surface of the fiber web. In this case, the cell culture sheet may further include a silicone-based adhesive layer between the support film and the fiber web.

In addition, the average diameter of the stem cells recovered after culturing under Culture Condition 1 or Culture Condition 2 may be smaller by 15% or more than the average diameter of the seeded stem cells. For example, the average diameter of the stem cells recovered after the culture may be 18 μm or less.

In addition, the functional coating layer may include a fusion protein between a functional peptide and an adhesion protein.

In addition, the present invention provides a large-capacity cell culture device, including a housing and the cell culture sheet according to the present invention, which is provided in a plurality of sheets inside the housing and is arranged in multiple stages at a predetermined interval along one direction.

In addition, the present invention provides a large-capacity cell culture system, including the large-capacity cell culture device according to the present invention, a medium supply device for supplying a medium necessary for cell culture to one side of the large-capacity cell culture device, and a pump for circulating the medium.

Hereinafter, the terms used in the present invention will be described.

As used herein, the term "extracellular matrix (ECM)" is a matrix that surrounds the outside of a cell, and it occupies a space between cells and means having a network structure mainly composed of proteins and polysaccharides.

As used herein, the term "motif" is a peptide which is included in extracellular matrix proteins, glycoproteins and the like that play an important role in the adhesion, migration and differentiation of cells, and is capable of structurally/functionally interacting with receptors provided to penetrate the surface or membrane of cell membranes, and it includes all those that are isolated in cells or artificially produced by using gene cloning techniques.

The cell culture sheet according to the present invention can proliferate the seeded cells with excellent efficiency as the surface morphology suitable for cell culture is implemented, and at the same time, the proliferated cells are prevented from agglomeration such as forming a thin film, and thus, the recovery rate is excellent. In addition, the surface morphology of the cell culture sheet suitably implemented in consideration of the cell size and type can improve cell adhesion and stably support the attached cells, and thus, there is an external force such as the circulating flow of the medium, and due to this, it is possible to achieve a high cell culture efficiency even in a culture environment in which the culture sheet is shaken. Furthermore, compared to conventional cultured cells, cells with a smaller size compared to the cell size during seeding are obtained, and when the cells are employed in a large-capacity culture device in which the medium is circulated, as smaller cells are obtained, it is very advantageous for proliferating younger and healthier without changing the character thereof. Furthermore, it is advantageous in differentiating stem cells into adipocytes, bone cells and the like to differentiate into target cells with excellent differentiation. For this reason, the cell culture sheet of the present invention can stably culture and recover target cells, particularly stem cells in large quantities, and can be widely applied to a large-capacity culture device for differentiating into a specific cell of interest.

DETAILED DESCRIPTION

Figure 1:
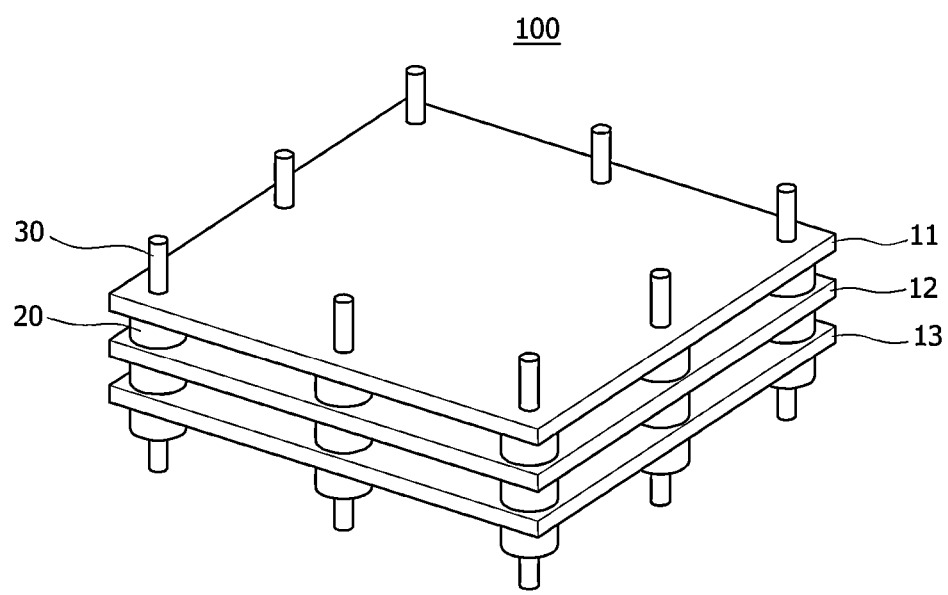
FIG. 1 is a perspective view of a cell culture sheet stack illustrated to evaluate the cell culture efficiency of the cell culture sheet according to Culture Condition 1.

Hereinafter, exemplary embodiments of the present invention will be described in detail with reference to the accompanying drawings such that those of ordinary skill in the art to which the present invention pertains can easily practice the present invention. The present invention may be embodied in many different forms and is not limited to the exemplary embodiments described herein. In order to clearly describe the present invention in the drawings, parts that are irrelevant to the description are omitted, and the same reference numerals are assigned to the same or similar components throughout the specification.

The cell culture sheet according to an exemplary embodiment of the present invention is implemented by including a fiber web which has a 3-dimensional network structure formed through the accumulation of support fibers having an average diameter of at most 1.5 μm, and has a basis weight of 1 to 15 g/m²; and a functional coating layer which is coated on the support fibers exposed on at least one surface of the fiber web, and has a function of promoting one or more of the adhesion, movement, proliferation and differentiation of cells In the fiber web, support fibers are accumulated to form a three-dimensional network structure, and specifically, each support fiber is independently folded and/or arranged without determining the fiber length direction, and by stacking the same, it is possible to form structurally more complex and various three-dimensional network structures. The complex and variously formed internal structure functions as a flow path for a culture solution including nutrients necessary for cell proliferation such that nutrients may be easily supplied to the cell adhesion surface in contact with the fiber web surface, and it is possible to prevent apoptosis and improve cell proliferation.

In this case, adhesion or fusion may occur between different surfaces in the single-stranded support fiber and/or between the surfaces of different support fibers, and through this, the three-dimensional network structure may be more structurally stabilized.

In addition, the surface of the fiber web formed by randomly arranging and accumulating support fibers may induce three-dimensional culture of cells by the surface morphology. As an example of the surface morphology, the surface of the fiber web may not be flat, an uneven surface may be formed, and the surface roughness may be large. The uneven surface morphology of the fiber web illustratively includes a plurality of concave portions and/or convex portions, and in addition to the three-dimensional growth effect of cells, cells may be more easily and firmly seated in the space between the convex portions or the grooves of the concave portions, and thus, there is an advantage of reducing the number of cells that are detached after being seated in the cell culture sheet.

The morphology of the surface of the fiber web on which the functional coating layer is formed as described above may have very different shapes depending on the diameter distribution of the fibers constituting the fiber web before the functional coating layer is formed, the arrangement of the fibers, the presence and degree of thermal compression after spinning, the temperature during thermal compression, the basis weight and thickness of the fiber web and the like, and it may vary depending on the degree of formation of the functional coating layer. As a result, the surface morphology may be defined through factors such as the fiber diameter in the fiber web on which the functional coating layer is formed, the air permeability of the fiber web, the surface roughness, pore size and porosity of the fiber web surface on which the functional coating layer is formed and the like. The inventors of the present invention studied the effect of various changes in the surface morphology according to the change of the above factors on the cell culture, and according to the morphology of the surface of the fiber web provided with the functional coating layer, it expresses an unexpected level of improved effects on cell proliferation and prevents the cells cultured on the cell culture sheet from forming a thin film to improve the separation and recovery of proliferated cells. In particular, when the cells to be seeded are stem cells, it is possible to obtain cells with a smaller cell size after culturing and proliferation in preparation for the cell size at the time of seeding without changing the cell trait, and the efficiency may be improved when the stem cells are differentiated into adipocytes, osteocytes and chondrocytes. Meanwhile, when the cell size is smaller after culturing and proliferation compared to the cell size during seeding, aging is minimized such that the cultured cells may be very young and the cell condition may be excellent. These characteristics are expressed even in culture conditions in which the medium is not exchanged, such as in Culture Condition 1 or 2, but as in Culture Conditions 3, the medium may be exchanged once after seeding, or it may be expressed more significantly in other culture conditions under a predetermined exchange cycle or continuously exchanged conditions. For example, at the time of seeding, cells with a diameter that is 15% or more and 30% smaller than the cell diameter may be cultured, and for example, when the seeded cells are stem cells, cells having a diameter of 18 μm or less may be obtained. These characteristics are expected to be influenced by the surface morphology of the cell culture sheet.

Meanwhile, the fiber web provided in the cell culture sheet of the present invention having excellent cell culture efficiency described above may have an average diameter of 1.5 μm or less of the support fibers constituting the fiber web in order to implement a surface morphology suitable for cell culture. Preferably, the average diameter of the support fibers may be 10 nm to 1.0 μm. In addition, the basis weight of the fiber web is 1 to 15 g/m². If the average diameter of the fiber is less than 10 nm, the mechanical strength may be weak, and it may be difficult to manufacture the fiber web. In addition, if the average diameter is more than 1.5 μm, the density (basis weight) of the fiber web may decrease, and there is a concern that the surface of the fiber web may be formed as if partially melted during thermal compression. In addition, if the basis weight is less than 1 g/m², there is a concern that handling is not easy when manufacturing the fiber web, and if it is more than 15 g/m², the fiber web may be melted in the pressing roll. In addition, when the support fiber diameter and basis weight conditions are not satisfied, it may be difficult to implement a surface morphology suitable for cell culture, and it may be difficult to achieve a desired level of cell culture efficiency and the like of the present invention. According to an exemplary embodiment of the present invention, the center line average roughness (Ra) of one side of the fiber web on which the functional coating layer is formed may be 0.15 to 1.0 μm, and the developed surface area ratio (Sdr) may be 1.3 to 3.0, and more preferably, 1.3 to 2.6, and it may be more advantageous to achieve the objects of the present invention when cultured on a fiber web having such a surface roughness. Herein, the developed surface area ratio (Sdr) means the ratio of the actual surface area in the area compared to the area whose roughness is measured in three dimensions, and a developed surface area ratio of 1 means that the measured area is flat, and the larger this ratio, the larger the specific surface area. If the center line average roughness is less than 0.15 and/or the developed surface area ratio is less than 1.3, the proliferated cells may agglomerate and the separation and recovery rate may decrease. In addition, since there are many surface pores that are blocked due to the functional coating layer, it is difficult to supply sufficient nutrients to the lower portions of the seeded cells attached to the surface of the fiber web, and thus, there is a concern that the cell culture efficiency may also be lowered. In addition, if the center line average roughness is more than 1.0 μm, and/or the developed surface area ratio is more than 3.0, the average diameter of the cultured stem cells may be cultured at a similar level compared to the time of seeding, and accordingly, it may be difficult to obtain young and less senescent cells. In addition, since the degree of adhesion between the fiber web and the cultured cells is strong after culture, it is not easy to separate the cultured cells, and as a result, the separation recovery rate may decrease or damage to the cultured cells may occur during separation. In addition, differentiation efficiency may decrease when the cultured stem cells are differentiated into specific cells.

Meanwhile, the cell culture sheet according to the present invention may be very suitable for stem cell culture, and for example, the stem cells may include any one or more selected from the group consisting of human induced pluripotent stem cells (hiPSC), human cardiac stem cells (hCSC), mesenchymal stem cells (MSC), mouse embryonic stem cells (mESCs) and osteoblasts. In this case, the average diameter of the support fibers provided on the fiber web in the cell culture sheet may be 200 to 600 nm, the center line average roughness (Ra) of one side of the fiber web on which the functional coating layer is formed may be 0.15 to 0.6 μm, and the developed surface area ratio (Sdr) may be 1.3 to 2.3, and the surface morphology of the fiber web with these factors may have excellent stem cell proliferation efficiency, and furthermore, the cultured stem cells do not form a membrane and may be separately recovered as individual cells, and thus, there is an advantage that it is possible to increase the number of cells that are separated and recovered. In addition, it is possible to recover stem cells in which the average diameter of the stem cells to be cultured is reduced by 15% or more compared to the time of seeding, in other words, the stem cells that do not undergo aging or have less advanced cell status. In addition, when the stem cells are differentiated in such a cell culture sheet, the differentiation efficiency may be improved compared to fiber webs or flat plates having surface morphologies with different differentiation efficiencies, when differentiating into adipocytes, bone cells, chondrocytes and the like.

According to an exemplary embodiment of the present invention, the cell culture sheet may include a fiber web having an average diameter of 500 to 600 nm, a basis weight of 3 to 12 g/m² and an air permeability of 4.5 to 8.0 cfm, and more preferably, it may be implemented with a basis weight of 3 to 10 g/m², and for example, 4.0 to 5.5 g/m². Further, in this case, the thickness of the fiber web may be 3 to 6 μm, and more preferably, 5 to 6 μm. As it is advantageous to achieve a synergistic effect in the differentiation efficiency of stem cells through the fiber web having such a surface morphology, it may be used as a cell culture sheet for the use of differentiation of stem cells.

In addition, the support fiber may include a conventional material used for cell culture, for example, at least one of polycarbonate (PC), polyacrylonitrile (PAN), polystyrene (PS), polyethersulfone (PES) and fluorine-based compounds. However, in consideration of both cell proliferation and recoverability, the support fiber may include a fluorine-based compound, among which polyvinylidene fluoride (PVDF) may be included. When the support fiber is PVDF, it may be advantageous not only to have excellent cell recovery characteristics, but also to implement the cultured cells that are smaller than the cell diameter at the time of seeding.

The above-described fiber web surface is provided with a functional coating layer having a function of inducing or promoting any one or more of cell adhesion, migration, proliferation and differentiation. When the surface morphology on the fiber web on which the functional coating layer is formed satisfies the conditions according to the present invention, it may be more advantageous to achieve the objects of the present invention in that an increased cell culture efficiency may be achieved compared to the case where the same functional coating layer is combined with a cell culture sheet on a smooth film.

The functional coating layer may include any one or more compounds and any one or more physiologically active components selected from the group consisting of monoamines, amino acids, peptides, saccharides, lipids, proteins, glycoproteins, glycolipids, proteoglycans, mucopolysaccharides and nucleic acids. These physiologically active components may specifically be materials present in the extracellular matrix or artificially manufactured materials that are identical or similar thereto.

In addition, the physiologically active component may include a motif. The motif may be a natural peptide or a recombinant peptide including a predetermined amino acid sequence provided in any one or more selected from proteins included in growth factors or the extracellular matrix, glycoproteins and proteoglycans. Specifically, the motif may include a predetermined amino acid sequence included in any one or more growth factors selected from the group consisting of adrenomedullin, angiopoietin, bone morphogenetic protein (BMP), brain-derived neurotrophic factor (BDNF), epidermal growth factor (EGF), erythropoietin, fibroblasts, fibroblast growth factor, glial cell line-derived neurotrophic factor (GDNF), granulocyte colony-stimulating factor (G-CSF), granulocyte macrophage colony-stimulating factor (GM-CSF), growth differentiation factor-9 (GDF9), hepatocyte growth factor (HGF), hepatoma-derived growth factor (HDGF), insulin-like growth factor (IGF), keratinocyte growth factor (KGF), migration-stimulating factor (MSF), myostatin (GDF-8), nerve growth factor (NGF), platelet-derived growth factor (PDGF), thrombopoietin (TPO), T-cell growth factor (TCGF), neuropilin, transforming growth factor-alpha (TGF-α), transforming growth factor-beta (TGF-β), tumor necrosis factor-alpha (TNF-α), vascular endothelial growth factor (VEGF), IL-1, IL-2, IL-3, IL-4, IL-5, IL-6 and IL-7. Alternatively, it may include a predetermined amino acid sequence included in any one or more extracellular matrices selected from the group consisting of hyaluronic acid, heparin sulfate, chondroitin sulfate, thermatin sulfate, keratan sulfate, algin salt, fibrin, fibrinogen, collagen, elastin, fibronectin, vitronectin, cadherin and laminin.

In addition, the motif may include both of a predetermined amino acid sequence included in the growth factor and a predetermined amino acid sequence included in the extracellular matrix. More preferably, the motif may include one or more selected from the group consisting of proteins composed by including the amino acid sequence of SEQ ID NO: 9 to SEQ ID NO: 30, and proteins in which at least two of these proteins are fused, but is limited thereto.

Meanwhile, the cell culture sheet may further include a bioactive component for improving adhesion. This component may prevent the cells loaded on the culture solution from floating by initially immobilizing the cultured cells on the cell culture sheet. In addition, it is possible to perform a function of preventing the physiologically active component from being separated from the cell culture sheet during the cell culture process by immobilizing the physiologically active component having no or weak adhesion on the cell culture sheet.

In addition, this component may include a known mussel protein or a specific domain or motif among mussel proteins in order to enhance the adhesion of cells. The adhesive component may be used without limitation in the case of a known adhesive component that does not cause cytotoxicity due to its normal biocompatibility, but preferably, it may include at least one selected from the group consisting of proteins in which the amino acid sequence of SEQ ID NO: 1 to SEQ ID NO: 8 is repeated once to 20 times, and proteins in which at least two of these proteins are fused. Through this, cytotoxicity may be remarkably lowered, and adhesion to other types of physiologically active components may be excellent, and at the same time, as it is not soluble in the culture solution during cell culture, there is an advantage in that the detachment of other types of physiologically active components or the isolation of cells may be prevented.

In addition, a motif corresponding to a protein exhibiting adhesiveness or a portion thereof may be covalently bonded with other types of motifs exhibiting physiological activity to be integrally implemented. That is, a fusion protein between an adhesion protein and a functional peptide having a function of promoting any one or more of the adhesion, migration, proliferation and differentiation of cells may be provided. For example, a motif such as the growth factor described above may be directly covalently bonded to the N-terminus and/or C-terminus of an adhesion protein, or covalently bonded by interposing a heterogeneous peptide or polypeptide, and in this case, it is possible to more firmly attach different types of physiologically active components to the cell culture sheet and further improve the cell culture efficiency. As a more specific example, as a protein in which an adhesion protein and a growth factor are fused, a fusion protein between the adhesion protein having the amino acid sequence of SEQ ID NO: 8 and the protein having the amino acid sequence of SEQ ID NO: 30 may be used.

In addition, the fiber web may have a web shape implemented by a known method such as spunbond or melt blown, or may be electrospun by using a dissolved or melted spinning solution. However, considering the average diameter of the fibers constituting the fiber web, it may be manufactured through electrospinning. In this case, the method of manufacturing the fiber web through electrospinning may appropriately employ a known method.

In addition, the above-described functional coating layer may be provided on the surface of the fiber web through a known method. For example, the physiologically active component may be coated on the fiber web (in this case, the surface of the fiber forming the fiber web) through a coating process. Alternatively, the physiologically active material may be mixed with a polymer compound forming the fiber web and provided from the crude liquid preparation step for manufacturing the fiber web. In this case, there is an advantage that the physiologically active material may be easily provided on the outer surface of the manufactured fibrous web or film without a separate coating process or a separate adhesive component for fixing the physiologically active material.

Meanwhile, in the case of a fiber web electrospun to have the same average diameter, through changes in whether air is spun together with the spinning solution during electrospinning, the applied air pressure, the distance of the air gap, the type of fiber-forming component in the spinning solution, and the temperature, pressure and time conditions during thermal compression after spinning, the surface morphology of the fibrous web may be appropriately changed to a desired level.

In addition, the cell culture sheet may be composed of a single sheet or multiple sheets of laminated fiber web alone. Alternatively, it may be a laminate in which a fiber web and one or several support films are combined. In this case, when the fiber web and the support film are bonded, they may be bonded through a silicone-based adhesive layer formed through an adhesive such as a silicone material, or through partial melting of the support film and/or the fiber web without an adhesive.

Due to the structural characteristics of such a fiber web, the number of cells recovered after culturing under Culture Condition 1 below may proliferate by 9 times or more per unit area (cm$^2$) compared to the number of seeded cells, and since it is possible to proliferate by preferably 15 times, more preferably, by 20 times or more, and much more preferably, by 30 times or more, it has a very high cell culture efficiency.

In this case, Culture Condition 1 is a condition where a total of 60 sheets of cell culture sheets at 25 cm×25 cm in width and length are spaced apart from each other to be fixed inside a housing such that there is a top and bottom interval of 1 mm between the cell culture sheets, and after injecting a medium mixed with stem cells into the housing, the housing is sealed from the outside air and cultured at 37° C. for 4 days, and it is a condition of culturing for 4 days without changing the medium.

In this case, the cell culture sheet is fixed and disposed such that the upper and lower surfaces, which are effective surfaces on which cells are cultured, do not touch the inner wall of the housing. When an example where the cell culture sheet is fixed to the housing will be described with reference to FIG. 1, holes are drilled at a predetermined interval along the edges of the cell culture sheets 11, 12, 13, and after penetrating a support 30 through the holes, a spacer 20 is provided so as not to touch the upper surface/lower surface of the housing and the cell culture sheets 11, 12, 13, and it may be fixed to the housing through a cell culture sheet stack 100 in which the spacing between the cell culture sheets 11, 12, 13 is controlled. Alternatively, as another example, the cell culture sheet may be inserted into a slit formed on the inner surface of the housing and fixed to the housing by fixing both sides, three sides or four sides of the cell culture sheet. In this case, it is possible to adjust the spacing between the cell culture sheets through the spacing of the slits.

In this case, the housing may be a conventional material used for cell culture. In addition, it may be provided with an inlet through which cells and medium to be seeded may be introduced. In addition, the structure may be sealed such that there is no movement of the outside air between the inside and the outside of the housing.

In addition, for the cell culture sheet used in Culture Condition 1, a laminated polycarbonate (PC) film with a thickness of 0.5 mm to prevent sagging that occurs when the fiber web is used alone and to maintain the spacing between the cell culture sheets at 1 mm may be used.

Meanwhile, when the effect of multistage arrangement of 60 sheets of cell culture sheets at 1 mm intervals under Culture Condition 1 is described, even if the medium required for cell culture is filled in the housing, over time, depending on the cell proliferation, a concentration difference or a pH difference of the medium component may be induced depending on the location of the cell, and as a result, cell proliferation efficiency may be reduced or the degree of cell proliferation may vary significantly depending on the location of the cell culture sheet, but the cell culture sheet according to the present invention has a very large cell proliferation effect per unit area even when a plurality of sheets are spaced apart at a very narrow interval, and thus, there is an advantage in that cells may be cultured with excellent efficiency even under the condition where the medium is not replaced and the cells are cultured in a large capacity. In addition, there is an advantage in that the recovered cells may be fully used as the cultured cells are not entangled with each other to form a film or cultured in a cluster due to substances generated during cell proliferation such as collagen and the like.

In addition, when cells are cultured by stacking cell culture sheets in multiple stages such that the interval between sheets is 1 mm as in Culture Condition 1, if the area of the cell culture sheet increases, cell culture efficiency may be significantly lowered due to medium components and pH that may not be uniform for each location, but the cell culture sheet according to an exemplary embodiment of the present invention may have excellent cell culture efficiency even when the area is increased to a large area of 100 cm$^2$ or more, 200 cm$^2$ or more, or 400 cm$^2$ or more.

In addition, the cell culture sheet according to an exemplary embodiment of the present invention is provided with a larger number of cell culture sheets as in Culture Condition 2 such that even when the cells are cultured, the number of cells recovered after culturing may be proliferated by 25 times or more per unit area (cm$^2$) compared to the number of seeded cells. More preferably, it may proliferate by 30 times or more.

Culture Condition 2 is a condition where 100 cell culture sheets at 25 cm×25 cm in width and length are spaced apart and fixed inside the housing such that there is a top and bottom interval of 1 mm between the cell culture sheets, and after injecting a medium mixed with stem cells into the housing, the housing is sealed from the outside air, and it is cultured at 37° C. for 5 days, and the medium is changed once 24 hours after stem cell seeding, and there is an advantage of proliferating cells by 25 times, more preferably, by 35 times or more, compared to the number of cells at the time of seeding, even when 100 cell culture sheets are stacked at 1 mm intervals when the medium is replaced once to implement the conditions for more active cell proliferation. Meanwhile, for the cell culture sheet used in Culture Condition 2, a laminated polycarbonate (PC) film with a thickness of 0.5 mm to prevent sagging that occurs when the fiber web is used alone and to maintain the spacing between the cell culture sheets at 1 mm may be used.

Meanwhile, the method of recovering the proliferated cells and counting the number of cells after culturing under Culture Conditions 1 and 2 for a predetermined number of days may use a conventional method in the art. For example, after removing the medium from the housing, a 0.05 to 0.25% Trypsin-EDTA solution controlled at a temperature 37° C. may be injected into the housing, and after a predetermined period of time, the medium may be injected again to suspend the separated cells from the cell culture sheet and collect them, and a centrifuge may be used to settle the cells, remove the supernatant, and mix the extracted cell solution with Trypan blue solution at a 1:1 ratio, and a cell counter may be used for the mixed solution to count the number of cells.

In addition, as the media used for above-described Culture Conditions 1 and 2, known suitable medium may be used depending on the type of stem cells. For example, the medium used when culturing mesenchymal stem cells (MSC) may be a medium prepared by adding fetal bovine serum (FSB) to a medium mixed with 500 mL of KBS Basal medium (B1001) and 2 mL of KSB-3 supplements (S2901) to make up 10% of the total weight of the medium, and including penicillin/streptomycin to 1/100 of the total medium volume.

The present invention may implement a large-capacity cell culture device by providing the above-described cell culture sheet. The large-capacity cell culture device is implemented by including a housing; and the cell culture sheet, which is provided in a plurality of sheets inside the housing and is arranged in multiple stages at a predetermined interval along one direction. In addition, the present invention may be implemented as a large-capacity cell culture system using the large-capacity cell culture device. The large-capacity cell culture system may be implemented with a large-capacity cell culture device, a medium supply device for supplying a medium required for cell culture to one side of the large-capacity culture device, and a pump for circulating the medium.

The housing, the medium supplying device and the pump constituting the large-capacity cell culture device may appropriately employ and modify the configurations that are commonly used for culturing cells in large-capacity in the art, and the detailed description thereof will be omitted. Alternatively, for the large-capacity cell culture system having the large-capacity cell culture device, medium supply device and pump, reference is made to Korean Patent Application No. 10-2018-0140008 by the applicant of the present invention, and when the cell culture sheet according to the present invention is employed in the patent document, it may be advantageous for culturing a large amount of young, healthy cells that are more remarkable and the size of the obtained cells is small.

Table 1 below shows the amino acid sequence of the physiologically active component provided in the above-described functional layer coating layer.

TABLE 1

| SEQ ID NO: | Amino acid sequence |
|---|---|
| 1 | Met Ala Lys Pro Ser Tyr Pro Pro Thr Tyr Lys Ala Lys Pro Ser TyrPro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ser Ser Glu Glu Tyr Lys Gly Gly Tyr Tyr Pro Gly Asn Thr Tyr His Tyr His Ser Gly Gly Ser Tyr His Gly Ser Gly Tyr His Gly Gly Tyr Lys Gly Lys Tyr Tyr Gly Lys Ala Lys Lys Tyr Tyr Lys Tyr Lys Asn Ser Gly Lys Tyr Lys Tyr Leu Lys Lys Ala Arg Lys Tyr His Arg Lys Gly Tyr Lys Lys Tyr Tyr Gly Gly Ser Ser Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys |

TABLE 1-continued

| SEQ ID NO: | Amino acid sequence |
|---|---|
| 2 | Met Ala Lys Pro Ser Tyr Pro Pro Thr Tyr Lys Ala Lys Pro Ser TyrPro Pro Thr Tyr Lys Ala Lys Pro Ser Tyr Pro Pro Thr Tyr Lys AlaLys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ser Ser Glu Glu Tyr Lys Gly Gly Tyr Tyr Pro Gly Asn Thr Tyr His Tyr His Ser Gly Gly Ser Tyr His Gly Ser Gly Tyr His Gly Gly Tyr Lys Gly Lys Tyr Tyr Gly Lys Ala Lys Lys Tyr Tyr Lys Tyr Lys Asn Ser Gly Lys Tyr Lys Tyr Leu Lys Lys Ala Arg Lys Tyr His Arg Lys Gly Tyr Lys Lys Tyr Tyr Gly Gly Ser Ser Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Gly Arg Gly Asp Ser Pro |
| 3 | Met Ala Lys Pro Ser Tyr Pro Pro Thr Tyr Lys Ala Lys Pro Ser TyrPro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Pro Trp Ala Asp Tyr Tyr Gly Pro Lys Tyr Gly Pro Pro Arg Arg Tyr Gly Gly Gly Asn Tyr Asn Arg Tyr Gly Arg Arg Tyr Gly Gly Tyr Lys Gly Trp Asn Asn Gly Trp Lys Arg Gly Arg Trp Gly Arg Lys Tyr Tyr Gly Ser Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Leu |
| 4 | Ala Asp Tyr Tyr Gly Pro Lys Tyr Gly Pro Pro Arg Arg Tyr Gly Gly Gly Asn Tyr Asn Arg Tyr Gly Arg Arg Tyr Gly Gly Tyr Lys Gly Trp Asn Asn Gly Trp Lys Arg Gly Arg Trp Gly Arg Lys Tyr Tyr |
| 5 | Ser Ser Glu Glu Tyr Lys Gly Gly Tyr Tyr Pro Gly Asn Thr Tyr His Tyr His Ser Gly Gly Ser Tyr His Gly Ser Gly Tyr His Gly Gly Tyr Lys Gly Lys Tyr Tyr Gly Lys Ala Lys Lys Tyr Tyr Lys Tyr Lys Asn Ser Gly Lys Tyr Lys Tyr Leu Lys Lys Ala Arg Lys Tyr His Arg Lys Gly Tyr Lys Lys Tyr Tyr Gly Gly Ser Ser |
| 6 | Ala Lys Pro Ser Tyr Pro Pro Thr Tyr Lys |
| 7 | Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys |
| 8 | Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ser Ser Glu Glu Tyr Lys Gly Gly Tyr Tyr Pro Gly Asn Ala Tyr His Tyr His Ser Gly Gly Ser Tyr His Gly Ser Gly Tyr His Gly Gly Tyr Lys Gly Lys Tyr Tyr Gly Lys Ala Lys Lys Tyr Tyr Lys Tyr Lys Asn Ser Gly Lys Tyr Lys Tyr Leu Lys Lys Ala Arg Lys Tyr His Arg Lys Gly Tyr Lys Lys Tyr Tyr Gly Gly Ser Ser Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys Ala Lys Pro Ser Tyr Pro Pro Thr Tyr Lys |
| 9 | Arg Gly Asp |
| 10 | Arg Gly Asp Ser |
| 11 | Arg Gly Asp Cys |
| 12 | Arg Gly Asp Val |
| 13 | Arg Gly Asp Ser Pro Ala Ser Ser Lys Pro |
| 14 | Gly Arg Gly Asp Ser |
| 15 | Gly Arg Gly Asp Thr Pro |
| 16 | Gly Arg Gly Asp Ser Pro |
| 17 | Gly Arg Gly Asp Ser Pro Cys |
| 18 | Tyr Arg Gly Asp Ser |
| 19 | Ser Pro Pro Arg Arg Ala Arg Val Thr |
| 20 | Tip Gln Pro Pro Arg Ala Arg Ile |
| 21 | Asn Arg Trp His Ser Ile Tyr Ile Thr Arg Phe Gly |
| 22 | Arg Lys Arg Leu Gln Val Gln Leu Ser Ile Arg Thr |
| 23 | Lys Ala Phe Asp Ile Thr Tyr Val Arg Leu Lys Phe |
| 24 | Ile Lys Val Ala Asn |
| 25 | Lys Lys Gln Arg Phe Arg His Arg Asn Arg Lys Gly Tyr Arg Ser Gln |

TABLE 1-continued

| SEQ ID NO: | Amino acid sequence |
|---|---|
| 26 | Val Ala Glu Ile Asp Gly Ile Gly Leu |
| 27 | Pro His Ser Arg Asn Arg Gly Asp Ser Pro |
| 28 | Asn Arg Trp His Ser Ile Tyr Ile Thr Arg Phe Gly |
| 29 | Thr Trp Tyr Lys Ile Ala Phe Gln Arg Asn Arg Lys |
| 30 | Pro His Ser Arg Asn Ser Gly Ser Gly Ser Gly Ser Gly Ser Gly Arg Gly Asp Ser Pro |

EXAMPLES

The present invention will be described in more detail through the following examples, but the following examples are not intended to limit the scope of the present invention, and these examples should be construed to aid the understanding of the present invention.

Example 1

First, in order to prepare a spinning solution, 12 g of polyvinylidene fluoride (Arkema, Kynar761) as a fiber-forming component was dissolved in 88 g of a mixed solvent in which dimethylacetamide and acetone were mixed at a weight ratio of 70:30 at a temperature of 80° C. for 6 hours by using a magnetic bar to prepare a mixed solution. The prepared spinning solution was electrospinned in an environment of 65% RH and 30° C. under conditions of a voltage of 25 kV, a distance between a current collector and a spinneret of 25 cm and a discharge amount of 0.05 ml/hole by using an electrospinning device. Further, in this case, the air was applied vertically in the direction of the spinneret adjacent to the discharge port. The final implemented fiber web had an average fiber diameter of 500 nm, a basis weight of 5.0 g/m$^2$, a thickness of 5 μm, a centerline average roughness (Ra) of 0.374 μm and a developed surface area ratio of 1.873.

After laminating the prepared fiber web in contact with the silicone-based adhesive side of a polycarbonate (PC) film having a thickness of 500 μm and having a silicone-based adhesive on one side, an integrated laminate-type cell culture sheet was manufactured which was attached by using a coating machine (digital-3500plus) at room temperature.

Afterwards, a functional coating layer was formed on the exposed surface of the fiber web. Specifically, the cell culture coating composition prepared in Preparation Example 1 below was impregnated with a fiber web portion and then reacted in a culture device at 30° C. for an hour to form a functional coating layer on the surface of the fiber web. Thereafter, after washing three times for 5 minutes each using tertiary distilled water, the cell culture sheet was manufactured by drying in air with the plate lid open in a clean bench.

Preparation Example 1-Preparation of Cell Culture Coating Composition

The physiologically active component was prepared by binding a functional peptide having the amino acid sequence of SEQ ID NO: 30 to the amino terminus or the carboxy terminus of the adhesive protein having the amino acid sequence of SEQ ID NO: 8 as a fusion protein. In this case, the fusion protein was prepared by a recombinant protein production method using E. coli.

Meanwhile, in order to prepare an active solution, a solution of NaOAc, NaHCO$_3$ and 2-(N-morpholino)ethanesulfonic acid dissolved in tertiary distilled water was first prepared, and then it was placed into microtubes where EDC and Sulfo-NHS reagents were respectively dispensed to prepare an EDC solution and Sulfo-NHS.

In order to prepare the cell culture coating composition, after the EDC solution was added to a conical tube, the Sulfo-NHS solution was added, and the fusion protein for cell culture was added to the prepared active solution while stirring, followed by stirring to prepare a cell culture coating composition. In this case, the cell culture coating composition was mixed such that 1 part by weight of EDC was included based on 100 parts by weight of the fusion protein for cell culture, and the EDC and Sulfo-NHS were mixed at a weight ratio of 1:2, and the NaOAc contained in the coating composition was included so as to be 100 parts by weight based on 100 parts by weight of EDC. In this case, the concentration of the fusion protein for cell culture in the cell culture coating composition was 0.1 mg/mL.

Examples 2 to 3

The cell culture sheet as shown in Table 2 below was manufactured in the same manner as in Example 1, except that the functional peptide of SEQ ID NO: 30 was changed to fusion proteins of SEQ ID NO: 28 and SEQ ID NO: 29 in the fusion protein of Preparation Example 1.

Comparative Example 1

A cell culture sheet was manufactured in the same manner as in Example 1, except that the fiber web with an average support fiber diameter of 1.65 μm, a basis weight of 16.4 g/m$^2$, a thickness of 5 μm, a center line average roughness (Ra) of 1.469 μm, and a developed surface area ratio of 3.087 was prepared by changing the voltage, discharge amount and air gap during spinning.

Comparative Example 2

It was manufactured in the same manner as in Example 1, except that a polycarbonate film having a thickness of 500 μm, which was plasma-treated on the surface without a fiber web, was used as a cell culture sheet, and the cell culture coating composition according to Preparation Example 1 was treated on one side of the film in the same manner to provide a physiologically active component.

Experimental Example 1

Figure 2:
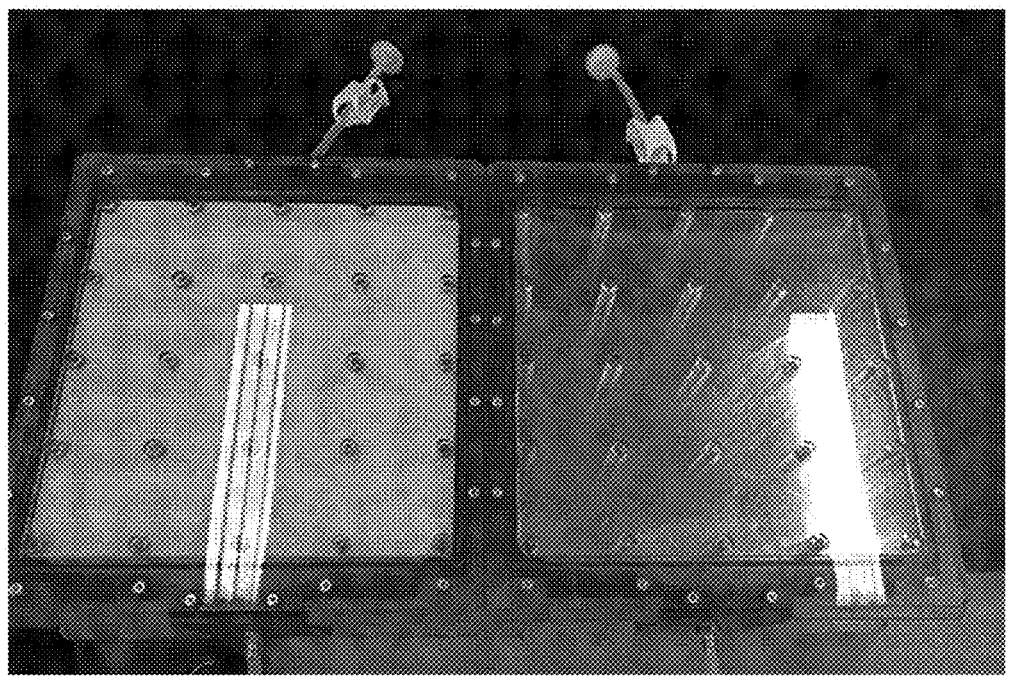
FIG. 2 is an image showing an exemplary housing used to evaluate the cell culture efficiency of the cell culture sheet and a cell culture sheet mounted on the housing.

After punching the manufactured cell culture sheet into 25 cm and 25 cm in width and length, respectively, the cell culture sheet was perforated so as to correspond to the inner support of the large-capacity culture device housing on the right side of FIG. 2. Afterwards, γ-ray was irradiated on the prepared cell culture sheet at an intensity of 5 kGy to sterilize the cell culture sheet.

Afterwards, the thickness of the support inside the large-capacity culture device housing was 1 mm, and a spacer which was perforated to correspond to the diameter of the support was passed. Thereafter, one cell culture sheet was mounted inside the large-capacity culture device such that the perforated hole passed through the support. A cell culture sheet assembly was implemented in which a total of 60 cell culture sheets were spaced apart by a vertical distance of 1 mm by passing a spacer with a thickness of 1 mm through the support and mounting one more cell culture sheet. After the large-capacity culture device housing was sealed from the outside air, a cell culture solution mixed with mesenchymal stem cells was introduced through a cell culture solution inlet tube provided on one side, and cultured at 37° C. for 4 days.

In this case, the cell culture solution was used in which fetal bovine serum (FBS) was added to a medium in which 2 mL of KSB-3 supplements (S2901) was mixed in 500 mL of KBS-3 Basal medium (B1001) so as to make up 10% of the total weight of the medium, and penicillin/streptomycin was included to be 1/100 of the total volume of the medium to provide a prepared cell culture solution such that the number of mesenchymal stem cells (MSCs) per unit area of the cell culture sheet was 8,000 cells/cm$^2$.

Subsequently, the cells proliferated through culture were recovered and the number of cells was counted. Specifically, after removing the medium from the large-capacity culture device, a 0.15% Trypsin-EDTA solution in which the temperature was controlled at 37° C. was injected into the housing, and the cultured cells were allowed to stand for a predetermined period of time to separate from the cell culture sheet and suspended, and in order to neutralize the trypsin component, it was injected into the same cell culture solution again, and then it was collected.

Afterwards, the collected solution was centrifuged to sediment the cells, the supernatant was removed, and the extracted cell solution was mixed with the Trypan blue solution at a 1:1 ratio, and the number of cells was counted by using a cell counter in the mixed solution, and the cell proliferation recovery rate calculated as a ratio of the number of cells recovered after proliferation compared to the number of seeded cells is shown in Table 2 below.

Experimental Example 2

The same large-capacity culture device as in Experimental Example 1 was manufactured. Afterwards, a cell culture solution mixed with mesenchymal stem cells was added and cultured at 37° C., but after 24 hours after cell seeding, the cell culture solution was replaced once with the same cell culture solution without mesenchymal stem cells, and it was cultured for a total of 5 days.

In this case, the cell culture solution mixed with the mesenchymal stem cells was used in which fetal bovine serum (FBS) was added to a medium in which 2 mL of KSB-3 supplements (S2901) was mixed in 500 mL of KBS-3 Basal medium (B1001) so as to make up 10% of the total weight of the medium, and penicillin/streptomycin was included to be 1/100 of the total volume of the medium to provide a prepared cell culture solution such that the number of mesenchymal stem cells (MSCs) per unit area of the cell culture sheet was 4,000 cells/cm$^2$.

Experimental Example 3

In Experimental Example 2, after culturing the cells, the large-capacity culture device was observed, and the presence or absence of a film membrane formed by agglomeration of the proliferated cells was observed with the naked eye. As a result, when the film membrane was not formed, it was marked as x, and when it was formed it was marked as ○. In addition, after culturing for 5 days in Example 1 and Comparative Example 2, images of the large-capacity culture device were taken and the results are shown in FIGS. 3 and 4, respectively.

Figure 3:
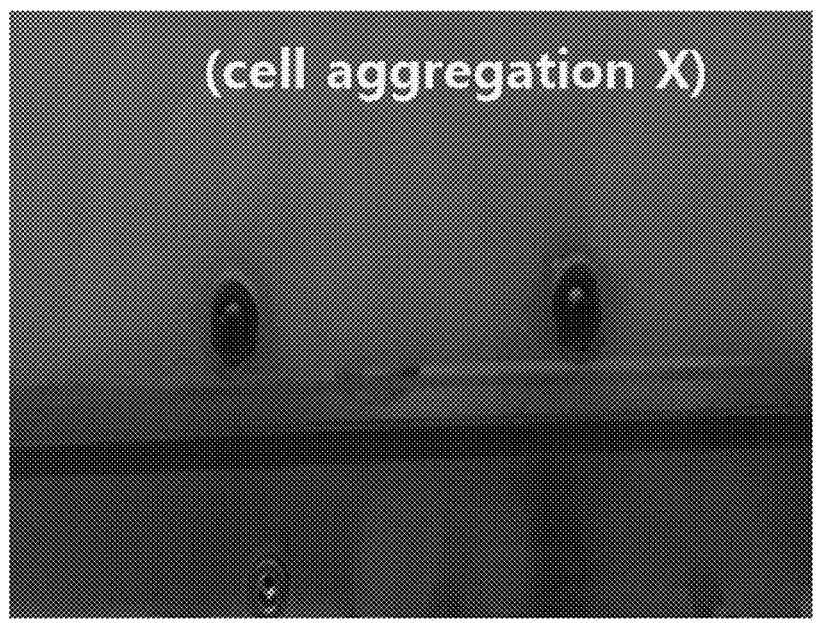
FIGS. 3 and 4 are images of observing whether stem cells aggregate to form a film membrane after stem cell culture by using the cell culture sheets according to Example 1 and Comparative Example 2, respectively.
Figure 4:
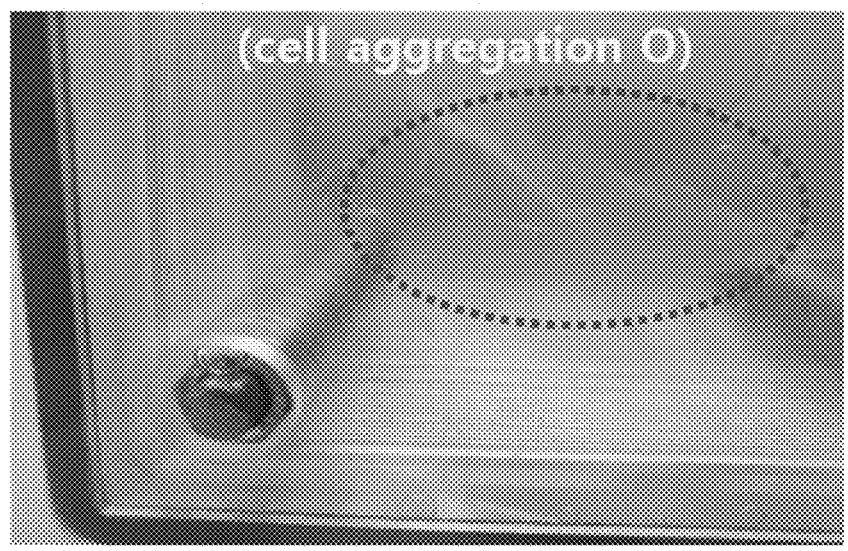

As can be confirmed from FIG. 3, in the case of Example 1, the cultured cells did not agglomerate, whereas in the case of Comparative Example 2 as shown in FIG. 4, it can be seen that a film membrane which formed by the agglomeration of the cultured cells was formed.

TABLE 2

| | Example 1 | Example 2 | Example 3 | Comparative Example 1 | Comparative Example 2 |
|---|---|---|---|---|---|
| Average diameter of support fiber (nm) | 500 | 500 | 500 | 1650 μm | Non-porous film |
| Basis weight of fiber web (g/m$^2$) | 5.0 | 5.0 | 5.0 | 16.4 | |
| Thickness (μm) | 5 | 5 | 5 | 5 | 500 |
| Bioactive components | SEQ ID NO: 8 + SEQ ID NO: 30 | SEQ ID NO: 8 + SEQ ID NO: 28 | SEQ ID NO: 8 + SEQ ID NO: 29 | SEQ ID NO: 8 + SEQ ID NO: 30 | SEQ ID NO: 8 + SEQ ID NO: 30 |
| Center line average roughness (Ra, μm) | 0.374 | 0.376 | 0.374 | 1.469 | 0.008 |
| Started area ratio | 1.873 | 1.870 | 1.868 | 3.087 | 1.002 |
| Number of seeded cells (cells/cm$^2$) | 8,000 | 8,000 | 8,000 | 8,000 | 8,000 |
| Recovery rate of cell proliferation (fold) (4 days culture, no medium change) | 10.8 | 9.2 | 9.3 | 7.2 | 5.8 |
| Recovery rate of cell proliferation (fold) (5 days culture, medium change once) | 34.5 | 25.3 | 26.1 | 20.5 | 18.6 |
| Cell film membrane formation | x | x | x | ○ | ○ |

As can be seen in Table 2 above, in the case of Examples 1 to 3 in which different physiologically active components were provided in the fiber web prepared according to Example 1, it can be seen that, in the case of culturing for 4 days and no medium change, the number of proliferated and recovered cells had excellent proliferation efficiency by 9 times or more compared to the number of seeded cells.

However, in the case of Comparative Example 2, which was a non-porous film, the number of proliferated and recovered cells was only 5.8 times that of the number of seeded cells when cultured for 4 days and no medium was changed, and thus, it can be seen that even when plasma treatment was performed, the surface morphology was not suitable for culturing stem cells.

In addition, even when a fiber web was used, in the case of Comparative Example 1 using a fiber web having an average diameter of the support fibers greater than 1.5 μm and a basis weight greater than 15 g/m$^2$, when the cells were cultured for 5 days and no medium was exchanged, the number of proliferated and recovered cells was only 7.2 times compared to the number of seeded cells, indicating that the surface morphology was not suitable for culturing stem cells compared to Example 1.

Experimental Example 4

In Experimental Example 2, the diameters of the cells before seeding and the diameters of the cells recovered in Example 1 and Comparative Example 2 through Experimental Example 2 were measured using a cell counter, and the results are shown in Table 3 below. Further, in comparison with the cells seeded before culture, the presence or absence of transformation of the cells proliferated and recovered through Example 1 and Comparative Example 2 was analyzed through FACS using CD markers (CD29, CD44, CD73, CD10, CD11b, CD34, CD45), and the results are shown together in Table 3 below. In this case, in the FACS analysis, the positive control was more than 95% and the negative control was less than 5%.

As a result of the evaluation, in the case of Example 1, it was confirmed that the positive control was derived at 97 to 99%, and the negative control was derived at 0.07 to 2.9%, and it was confirmed that the cells were proliferated without cell transformation.

Experimental Example 5

By using the cell culture sheets according to Example 1 and Comparative Example 2, mesenchymal stem cells were differentiated into each of the following cells, and the differentiation results are shown in Table 3.

1. Bone Cell Differentiation

As a growth medium used during differentiation, DMEM+10% FBS+1× GlutaMAX+P/S+5 ng/mL bFGF was used, and as a bone differentiation medium for bone differentiation, a commercial product of Stemcell Technologies, MesenCult™ Osteogenic Differentiation Kit (Human) was used. In addition, as a fat differentiation medium, a commercial product of Stemcell Technologies, MesenCult™ Adipogenic Differentiation Kit (Human) was used. In addition, as a cartilage differentiation medium, a commercial product of DMEM+0.3 mM Ascorbic acid+0.35 mM Proline+10-7 M Dexamethasone+1×ITS-3+10 ng/mL TGF-β3 was used.

Specifically, after cell thawing and culturing for 5 days, bone differentiation was attempted using the cultured stem cells. Specifically, for cell thawing and culturing, 1×10$^6$ cells/vial stock was seeded into two 75T flasks, and the medium was exchanged the next day, and afterwards, the medium was exchanged on day 3 and day 5 thereafter. In this case, when the T-flask was filled with about 90% of the cells, the subculture was performed, and specifically, the cells were seeded on the cell culture sheet at a concentration of 4×10$^3$ cells/cm$^2$.

1. Bone Differentiation

Figure 5:
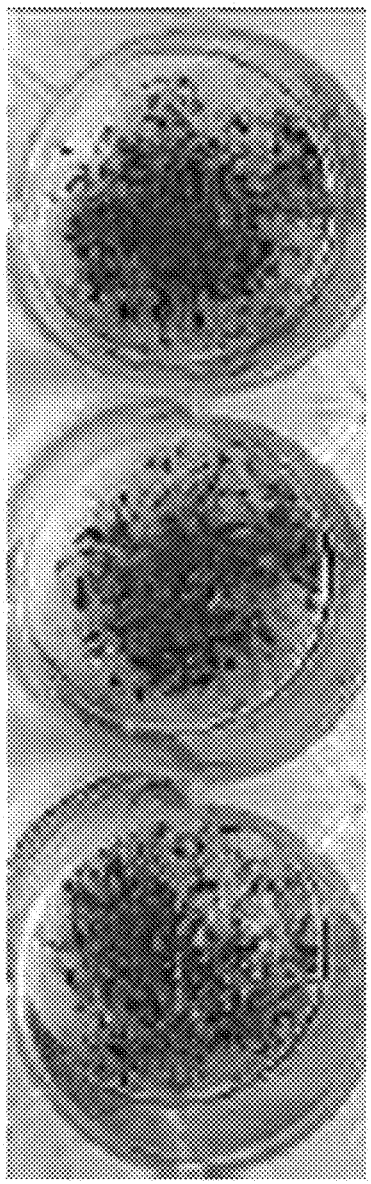
FIGS. 5 and 6 are images of the results of differentiating stem cells into bone cells by using the cell culture sheets according to Example 1 and Comparative Example 2, respectively.
Figure 6:
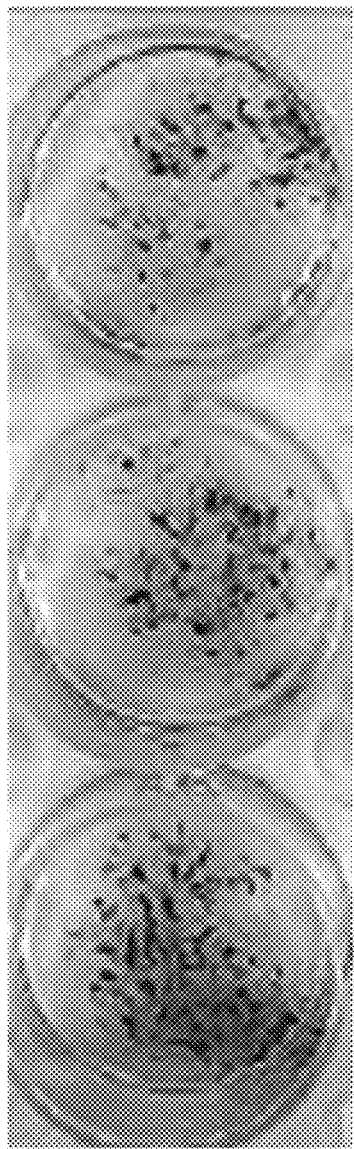
Figure 7:
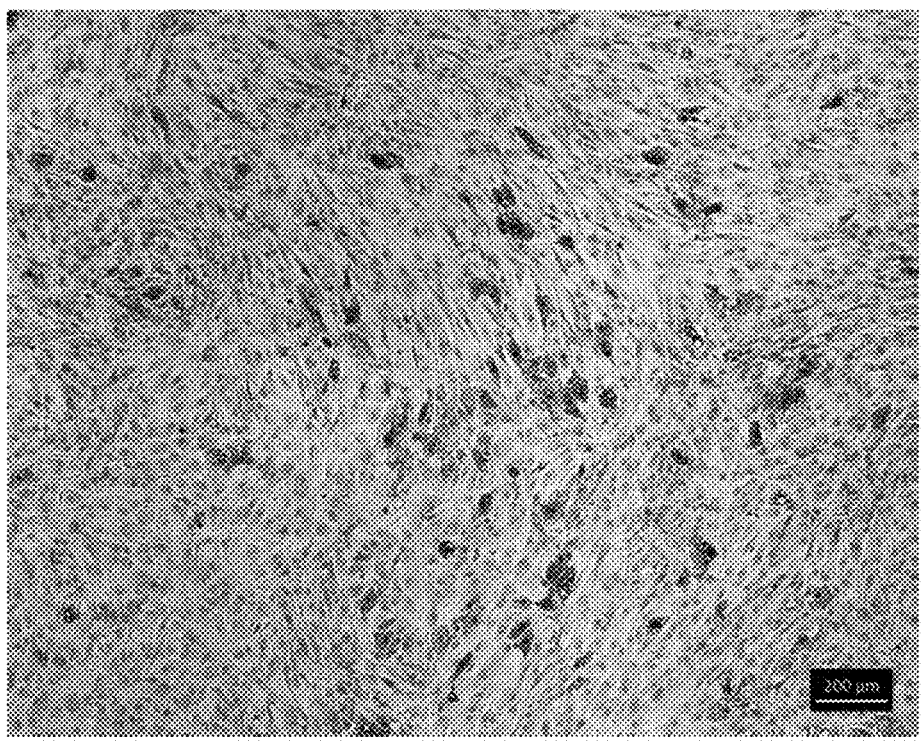
FIGS. 7 and 8 are images of the results of differentiating stem cells into adipocytes by using the cell culture sheets according to Example 1 and Comparative Example 2, respectively.
Figure 8:
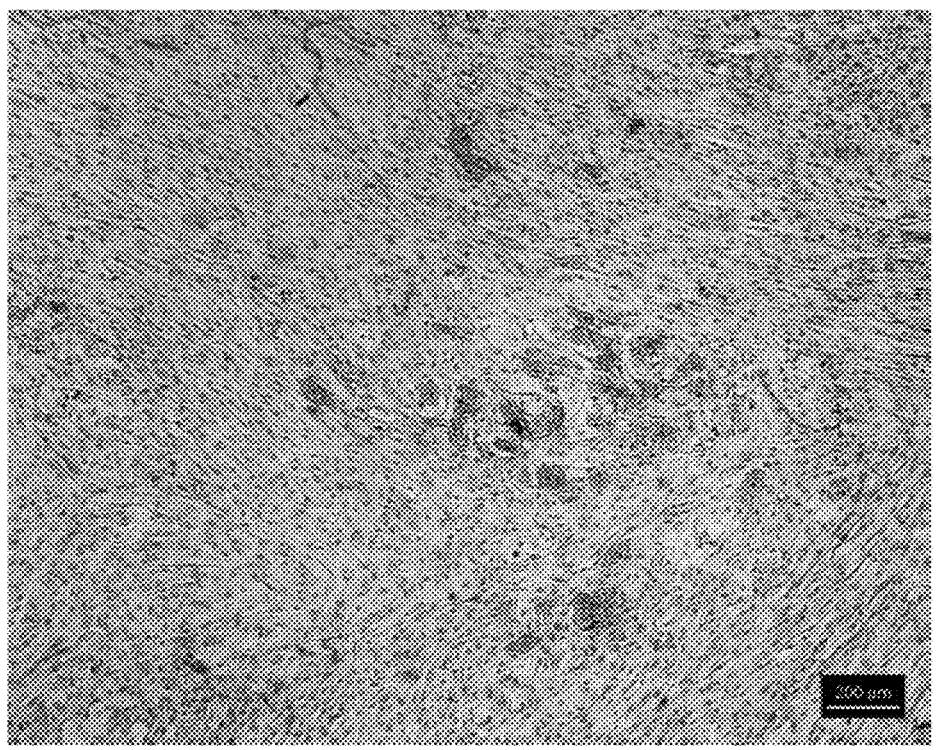
Figure 9:
FIGS. 9 and 10 are AFM images of the surface of the fiber webs according to Examples 1 and 4, respectively, and it can be confirmed on the image that a film, which is a functional coating layer connected between fibers, is formed.
Figure 10:
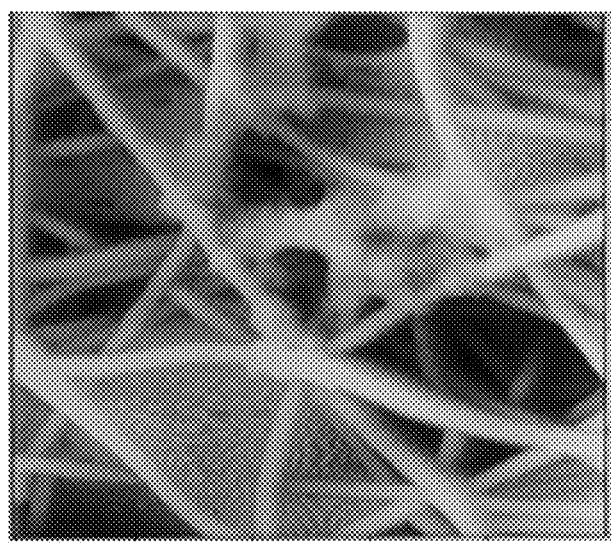

Subsequently, for bone differentiation, the stem cells cultured above were seeded at 4×10$^3$ cells/cm$^2$ in 12 well-plates each equipped with cell culture sheets. Cells were cultured with growth medium until the cells were filled in the well-plate, and when the cells were full in the plate, the growth medium was removed, washed once with PBS, and 1 mL of the bone differentiation medium was added to each well, and the bone differentiation medium was exchanged every 3 days, and differentiation was carried out for 2 weeks. After the differentiation was completed, the supernatant of the cell solution was removed and washed once with PBS, and then, 3.7% formaldehyde was added and fixed at room temperature for 10 minutes. Afterwards, formaldehyde was removed and washed three times with PBS, and 1 mL of 2% Alizarin red S solution was added after removing the PBS, followed by staining for 10 minutes. After removing the Alizarin red S solution, it was washed three times using DW, and it was observed whether Alizarin red S was stained with the naked eye and a microscope (related images in FIGS. 5 and 6).

Afterwards, the absorbance was measured at 562 nm after diluting 10 times using a 10% cetylpyridinium chloride (CPC) solution.

2. Adipocyte Differentiation

Afterwards, for adipocyte differentiation, it was performed in the same manner as for bone differentiation, but the medium was changed to adipocyte differentiation medium and cultured for 3.5 weeks. After removing the supernatant of the cells after differentiation was completed, the cells were washed once with PBS, and 3.7% formaldehyde was added and fixed at room temperature for 10 minutes. Afterwards, formaldehyde was removed, and it was washed three times with PBS, and 1 mL of 60% isopropanol was added and reacted for 5 minutes. During the reaction time, an Oil Red 0 walking solution was prepared, and in this case, a mixture of Oil Red S stock solution (manufactured by Sigma) and water mixed at a ratio of 3:2 was used. After removing the PBS, 1 mL of Oil Red 0 walking solution was added to carry out staining for 20 minutes, and after removing the Oil Red 0 walking solution, it was washed 5 times with water. Afterwards, it was analyzed whether Oil Red 0 was stained by using a microscope (stained in red on the area where fat was formed), and then, after adding 1 mL of 60% isopropanol, washing for 5 minutes, adding 300 μL of 100% isopropanol and shaking for 5 minutes, the dyed Oil Red 0 was eluted and absorbance was measured at 492 nm.

3. Cartilage Differentiation

Next, for differentiation into cartilage tissue, it was performed in the same manner as for bone differentiation, but the medium was changed to cartilage tissue differentiation medium, and it was cultured for 2 weeks. After the differentiation was completed, the cartilage tissue was transferred to PBS and washed, and B. after removing the PBS on the cartilage tissue surface, the wet weight was measured by using a microbalance.

TABLE 3

|  | Example 1 | Comparative Example 2 | Seeded cells |
|---|---|---|---|
| Average size of isolated cells (μm) | 15.5 | 19.9 | 21.3 |
| Presence or absence of cell transformation | None | None | — |
| Osteocyte differentiation (absorbance at 562 nm) | 1.58 | 0.56 | — |

TABLE 3-continued

|  | Example 1 | Comparative Example 2 | Seeded cells |
|---|---|---|---|
| Adipocyte differentiation (absorbance at 492 nm) | 1.4 | 0.98 | — |
| Chondrocyte differentiation (mg/pellet) | 1.91 | 0.78 | — |

As can be seen from Table 3, it was confirmed that the cells proliferated and recovered through the cell culture sheets of Example 1 and Comparative Example 2 had no change in cell traits. However, the size of the cells proliferated and recovered from the cell culture sheet of Example 1 was somewhat smaller than the size of the cells proliferated and recovered from the cell culture sheet of Comparative Example 2, and through this, it can be seen that the cultured cells were very young and the cell condition was excellent. The small size of the cells proliferated and recovered through the cell culture sheet according to Example 1 was due to the topology effect due to the fiber web morphology and the fiber web characteristics compared to the film, and it can be seen that this effect can be more excellently achieved through the fiber web provided in the present invention.

Examples 4 to 7

The cell culture sheets as shown in Table 4 were manufactured in the same manner as in Example 1, except that the air gap, discharge amount and air intensity were changed.

Experimental Example 6

For the cell culture sheets according to Examples 1, 4 to 7, Experimental Examples 2, 3, and 5 were carried out in the same manner, and the results are shown in Table 4 below.

TABLE 4

|  | Example 1 | Example 4 | Example 5 | Example 6 | Example 7 |
|---|---|---|---|---|---|
| Average diameter of support fiber (nm) | 500 | 300 | 800 | 1000 | 100 |
| Basis weight of fiber web (g/m$^2$) | 5.0 | 4.2 | 6.5 | 8.2 | 2.0 |
| Thickness (μm) | 5 | 5 | 5 | 5 | 5 |
| Bioactive components | SEQ ID NO: 8 + SEQ ID NO: 30 | SEQ ID NO: 8 + SEQ ID NO: 30 | SEQ ID NO: 8 + SEQ ID NO: 30 | SEQ ID NO: 8 + SEQ ID NO: 30 | SEQ ID NO: 8 + SEQ ID NO: 30 |
| Center line average roughness (Ra, μm) | 0.374 | 0.196 | 0.594 | 0.871 | 0.103 |
| Started area ratio | 1.873 | 1.919 | 2.287 | 2.499 | 1.142 |
| Number of seeded cells (cells/cm$^2$) | 4,000 | 4,000 | 4,000 | 4,000 | 4,000 |
| Recovery rate of cell proliferation (fold)(5 days culture, medium change once) | 34.5 | 32.8 | 30.5 | 25.2 | 22.1 |
| Cell film membrane formation | x | x | x | ○ | ○ |
| Osteocyte differentiation (absorbance at 562 nm) | 1.4 | 1.3 | 1.1 | 1.0 | 0.9 |
| Chondrocyte differentiation (mg/pellet) | 1.91 | 1.69 | 1.46 | 1.10 | 1.05 |

As can be seen from Table 4, compared to the cell culture sheets according to Examples 6 to 7, the separation and recovery rates of the cells cultured with the cell culture sheets according to Examples 1, 4 and 5 were excellent, and the differentiation efficiency of stem cells was very excellent in Examples 1 and 4 compared to other types, and particularly, it can be seen that the cell culture sheet according to Example 1 was excellent.

Although an exemplary embodiment of the present invention has been described above, the spirit of the present invention is not limited to the exemplary embodiment presented in the present specification, and those skilled in the art who understand the spirit of the present invention will be able to easily suggest other exemplary embodiments by modifying, changing, deleting or adding components within the scope of the same spirit, but this is also said to be within the scope of the present invention.

The invention claimed is:

1. A cell culture sheet, comprising:
a fiber web which has a 3-dimensional network structure formed through accumulation of support fibers having an average diameter of at most 1.5 μm, and has a basis weight of 1 to 15 g/m$^2$; and
a functional coating layer which is coated on the support fibers exposed on at least one surface of the fiber web, and has a function of promoting one or more of adhesion, movement, proliferation and differentiation of cells, wherein a center line average roughness (Ra) of one surface of the fiber web on which the functional coating layer is formed is 0.15 to 0.6 µm, and a developed surface area ratio (Sdr) is 1.3 to 2.3.

2. The cell culture sheet of claim 1, wherein the cell culture sheet is configured to culture stem cells.

3. The cell culture sheet of claim 2, wherein the stem cells are at least one selected from the group consisting of human induced pluripotent stem cells (hiPSC), human cardiac stem cells (hCSC), mesenchymal stem cells (MSC), murine embryonic stem cells (mESCs) and osteoblasts.

4. The cell culture sheet of claim 1, wherein the support fibers comprise polyvinylidene fluoride (PVDF).

5. The cell culture sheet of claim 1, wherein the cell culture sheet is configured to culture stem cells, and the average diameter of the support fibers is 200 to 600 nm.

6. The cell culture sheet of claim 1, further comprising a support film fixed to one surface of the fiber web.

7. The cell culture sheet of claim 6, further comprising a silicone-based adhesive layer between the support film and the fiber web.

8. The cell culture sheet of claim 2, wherein a number of stem cells recovered after culturing under Culture Condition 1 below is 9 times or more per unit area ($cm^2$) compared to a number of seeded stem cells:

[Culture Condition 1]
60 cell culture sheets at 25 cm×25 cm in width and length per sheet are fixed inside a housing wherein a spacing between adjacent cell culture sheets is 1 mm, and after a medium mixed with the stem cells is injected into the housing, the housing is sealed from outside air and cultured at 37° C. for 4 days.

9. The cell culture sheet of claim 2, wherein a number of stem cells recovered after culturing under Culture Condition 2 below is 25 times or more per unit area ($cm^2$) compared to a number of seeded stem cells:

[Culture Condition 2]
100 cell culture sheets at 25 cm×25 cm in width and length per sheet are fixed inside a housing wherein a spacing between adjacent cell culture sheets is 1 mm, and after a medium mixed with the stem cells is injected into the housing, the housing is sealed from outside air and cultured at 37° C. for 5 days, and after 24 hours after seeding the stem cells, the stem cells are cultured by replacing the medium mixed with stem cells with the same medium, wherein the same medium does not include stem cells.

10. The cell culture sheet of claim 8, wherein the average diameter of the stem cells recovered after culturing under Culture Condition 1 is smaller by 15% or more than the average diameter of the seeded stem cells.

11. The cell culture sheet of claim 10, wherein the average diameter of the stem cells recovered after culturing under Culture Condition 1 is 18 µm or less.

12. The cell culture sheet of claim 1, wherein the functional coating layer comprises a fusion protein comprising a functional peptide and an adhesion protein.

13. A large-capacity cell culture device, comprising:
a housing; and
a plurality of cell culture sheets according to claim 1 inside the housing and arranged in multiple stages at a predetermined interval along one direction.

14. A large-capacity cell culture system, comprising:
the large-capacity cell culture device according to claim 13;
a medium supply device for supplying a medium necessary for cell culture to one side of the large-capacity cell culture device; and
a pump for circulating the medium.

15. The cell culture sheet of claim 9, wherein the average diameter of the stem cells recovered after culturing under Culture Condition 2 is smaller by 15% or more than the average diameter of the seeded stem cells.

16. The cell culture sheet of claim 15, wherein the average diameter of the stem cells recovered after culturing under Culture Condition 2 is 18 µm or less.

* * * * *